US011747025B2

(12) United States Patent
Ingram

(10) Patent No.: US 11,747,025 B2
(45) Date of Patent: Sep. 5, 2023

(54) APPARATUS AND PROCESS FOR AMATEUR HVAC INSTALLATION

(71) Applicant: Jason Ingram, Boaz, KY (US)

(72) Inventor: Jason Ingram, Boaz, KY (US)

(73) Assignee: JOI Holding LLC, Boaz, KY (US)

( * ) Notice: Subject to any disclaimer, the term of this patent is extended or adjusted under 35 U.S.C. 154(b) by 679 days.

(21) Appl. No.: 16/838,715

(22) Filed: Apr. 2, 2020

(65) Prior Publication Data

US 2021/0003329 A1 Jan. 7, 2021

Related U.S. Application Data

(63) Continuation-in-part of application No. 16/691,500, filed on Nov. 21, 2019, now abandoned, which is a
(Continued)

(51) Int. Cl.

| | |
|---|---|
| *F24F 1/0003* | (2019.01) |
| *B23P 15/26* | (2006.01) |
| *F25B 41/20* | (2021.01) |
| *F24F 1/0007* | (2019.01) |
| *F24F 1/20* | (2011.01) |

(Continued)

(52) U.S. Cl.
CPC ............ *F24F 1/0003* (2013.01); *B23P 15/26* (2013.01); *F24F 1/0007* (2013.01); *F24F 1/20* (2013.01); *F24F 1/32* (2013.01); *F24F 13/32* (2013.01); *F25B 41/20* (2021.01); *F25B 41/40* (2021.01); *F24F 2221/36* (2013.01)

(58) Field of Classification Search
CPC .......... F24F 1/0003; F24F 1/0007; F24F 1/20; F24F 1/32; F24F 13/32; F24F 2221/36; B23P 15/26; F25B 41/20; F25B 41/40; F25B 45/00; F25B 2345/006; F16L 29/04
USPC ....................................................... 62/259.1
See application file for complete search history.

(56) References Cited

U.S. PATENT DOCUMENTS

| | | |
|---|---|---|
| 2,359,648 A | 10/1944 | Jones |
| 2,628,850 A | 2/1953 | Summerville |
| | (Continued) | |

FOREIGN PATENT DOCUMENTS

| | | |
|---|---|---|
| BR | PI1320579 A2 | 3/2016 |
| CN | 111780227 A | 10/2020 |
| | (Continued) | |

OTHER PUBLICATIONS

Office Action re CA3,093,937, dated Feb. 24, 2022, 4 pages.

*Primary Examiner* — Steve S Tanenbaum
(74) *Attorney, Agent, or Firm* — Patterson Intellectual Property Law, PC; Seth R. Ogden; Alex H. Huffstutter

(57) ABSTRACT

Apparatuses, systems, and methods for providing non-expert installation of HVAC systems are provided. The HVAC system includes an indoor unit, an outdoor unit, a first pre-charged refrigerant line-set, a second pre-charged refrigerant line-set, and a line-set coupler, each containing pre-pressurized refrigerant securely positioned therein prior to engagement between two or more of the aforementioned elements. The first pre-charged refrigerant line-set is couplable between an indoor unit refrigerant port of the indoor unit and a first coupler end of the line-set coupler. The second pre-charged refrigerant line-set is couplable between an outdoor unit refrigerant pot of the outdoor unit and a second coupler end of the line-set coupler.

9 Claims, 26 Drawing Sheets

Related U.S. Application Data continuation-in-part of application No. 16/503,441, filed on Jul. 3, 2019, now abandoned, which is a continuation-in-part of application No. 15/718,009, filed on Sep. 28, 2017, now abandoned.

(60) Provisional application No. 62/400,899, filed on Sep. 28, 2016.

(51) Int. Cl.
*F24F 1/32* (2011.01)
*F24F 13/32* (2006.01)
*F25B 41/40* (2021.01)

(56) References Cited

U.S. PATENT DOCUMENTS

| | | | |
|---|---|---|---|
| 2,771,308 A | 11/1956 | Vitcha et al. | |
| 2,883,813 A | 4/1959 | Shannon | |
| 2,934,915 A * | 5/1960 | Morse | F25B 41/40 |
| | | | 62/298 |
| 2,959,027 A | 11/1960 | Ewing | |
| 3,039,794 A | 6/1962 | Cenzo | |
| 3,208,232 A | 9/1965 | Madison et al. | |
| 3,337,244 A | 8/1967 | Appleberry | |
| 3,507,322 A | 4/1970 | McLean et al. | |
| 3,611,743 A | 10/1971 | Manganaro | |
| 4,184,661 A * | 1/1980 | Kushner | F25B 41/40 |
| | | | 62/299 |
| 4,321,797 A | 3/1982 | Yaeger et al. | |
| 4,378,923 A | 4/1983 | Takei | |
| 4,540,021 A | 9/1985 | Rogers | |
| 4,753,268 A | 6/1988 | Palau | |
| 4,852,611 A | 8/1989 | Knerr et al. | |
| 5,123,446 A | 6/1992 | Haunhorst et al. | |
| 5,215,122 A | 6/1993 | Rogers et al. | |
| 5,220,810 A | 6/1993 | Keltner | |
| 5,323,808 A | 6/1994 | Shimizu | |
| 5,464,042 A | 11/1995 | Haunhorst | |
| 6,662,587 B2 | 12/2003 | Rembold et al. | |
| 7,007,493 B2 | 3/2006 | Kadle et al. | |
| 10,132,541 B2 | 11/2018 | Kawabe et al. | |
| 11,125,479 B1 | 9/2021 | Ingram | |
| 2003/0015679 A1 | 1/2003 | Haunhorst et al. | |
| 2003/0106715 A1 | 6/2003 | Clemmons | |
| 2003/0192335 A1 * | 10/2003 | Rembold | F25B 41/40 |
| | | | 62/298 |
| 2010/0126188 A1 | 5/2010 | Clarke | |
| 2012/0119032 A1 | 5/2012 | Benassi et al. | |
| 2012/0211209 A1 * | 8/2012 | Choi | F25B 41/40 |
| | | | 285/305 |
| 2012/0318005 A1 | 12/2012 | Lingrey et al. | |
| 2015/0115597 A1 | 4/2015 | Lorraine | |
| 2016/0003394 A1 * | 1/2016 | Reasoner | F16L 37/32 |
| | | | 251/149.6 |
| 2018/0080668 A1 | 3/2018 | Booten et al. | |
| 2018/0087783 A1 | 3/2018 | Ingram | |
| 2019/0193093 A1 | 6/2019 | Matlack et al. | |
| 2019/0383515 A1 | 12/2019 | McGraw et al. | |
| 2020/0370764 A1 | 11/2020 | Strickland | |
| 2021/0088251 A1 | 3/2021 | Martinez Galvan et al. | |

FOREIGN PATENT DOCUMENTS

| | | | | |
|---|---|---|---|---|
| EP | 1041347 | A2 | 10/2000 | |
| EP | 2388501 | A1 | 11/2011 | |
| FR | 2906014 | A1 * | 3/2008 | F16L 29/04 |
| FR | 2906014 | A1 | 3/2008 | |
| FR | 2994592 | A1 | 2/2014 | |
| KR | 1020060096950 | A | 9/2006 | |

* cited by examiner

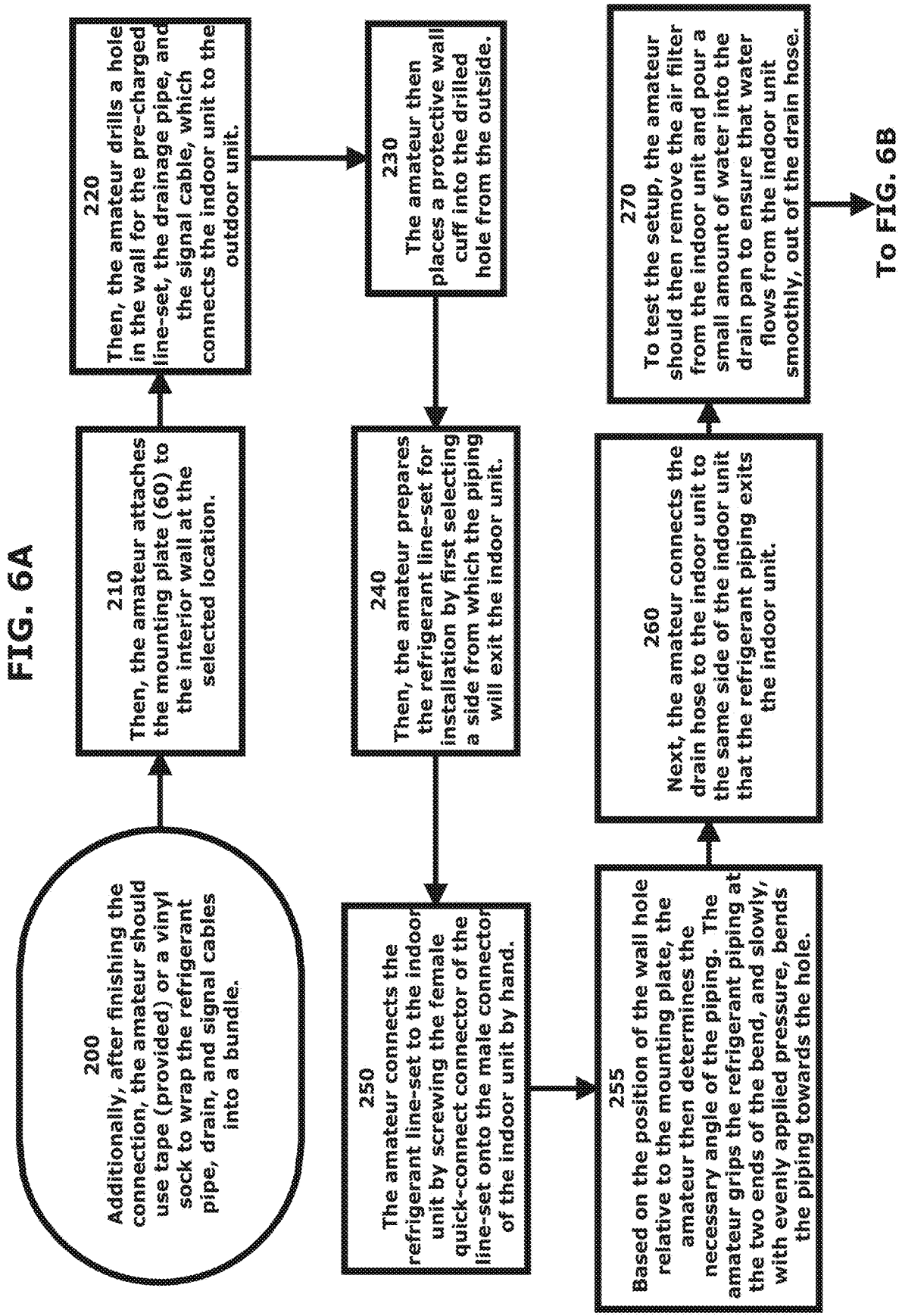

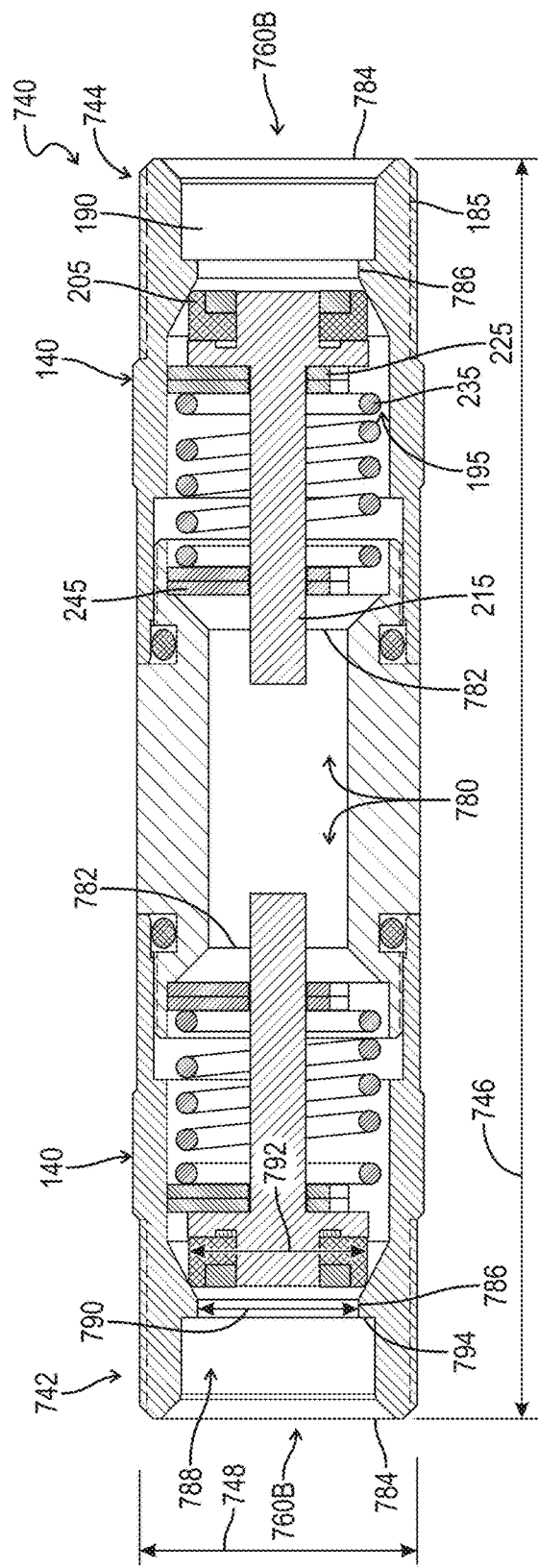
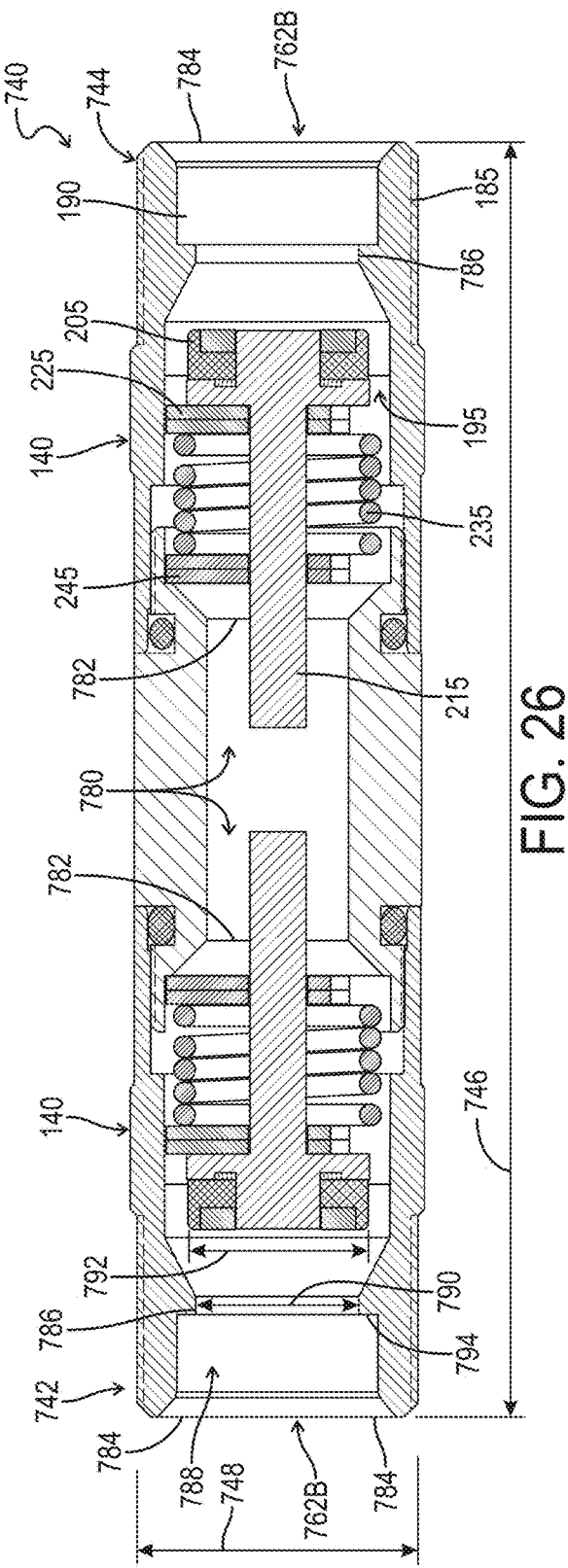

APPARATUS AND PROCESS FOR AMATEUR HVAC INSTALLATION

CROSS-REFERENCES TO RELATED APPLICATIONS

This application claims benefit of the following patent applications which are hereby incorporated by reference: U.S. patent application Ser. No. 16/691,500 filed Nov. 21, 2019, which is a Continuation-in-Part application of U.S. patent application Ser. No. 16/503,441 filed Jul. 3, 2019, which is a Continuation-in-Part application of U.S. patent application Ser. No. 15/718,009 filed Sep. 28, 2017, which is a Nonprovisional application and which claims priority based upon U.S. Patent Application Ser. No. 62/400,899 filed Sep. 28, 2016, which is a Provisional application.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention generally relates to HVAC systems. More particularly, this invention pertains to an HVAC solution equipped with pre-pressurized line-sets and which configured to be safely installed and maintained by an amateur without professional assistance.

2. Description of the Prior Art

The heating, ventilating, and air conditioning (HVAC) industry designs and manufactures air conditioner and heat pump systems that modify air temperature in residential and commercial buildings. Such products are typically distributed through a chain of HVAC contractors who are also responsible for the installation and warranty support of the product. This system has resulted in a modern marketplace with very high costs for the end-user. Product technology and design is the main force driving these high costs.

Historically, air conditioners and heat pumps relied on chemical refrigerants to move heat in or out of the interior environment. While the exact chemical formula has changed over the years, chemical refrigerants are the best technology by which to modify interior air temperature, but their presence in the system vastly complicates the installation process. Professional personnel rely on specialized equipment like a vacuum pump in order to properly charge a system in the field. This requirement virtually guarantees the average homeowner cannot install or maintain the product they purchase themselves.

Socioeconomic factors further stratified air conditioners and heat pumps into expensive products requiring specialist assistance to utilize. The mid-20th century emphasis on large, suburban homes allowed duct-connected systems to dominate the marketplace, since a ducted system is the most efficient way to condition such spaces. The reliance on ductwork carried intrinsic costs of its own while further emphasizing the necessity of specialist training to properly install any purchased product. Only the most technologically sophisticated end-users could purchase and install their own home HVAC system without relying on expensive, skilled labor.

Compounding the cost problem, HVAC manufacturers systematically divided the domestic market into territories where only one or two wholesale distributors could provide product to a similarly limited number of field installation companies. HVAC manufacturers often required such field installation companies to complete specific training courses in order to be officially certified to install the manufacturer's product. Non-certified installation often voids the warranty agreement.

Market division of this nature simplified the distribution chain, but it decreased competition in local markets. It also allowed field installation companies to greatly inflate the product price by 100% or more. The installation companies could do so, because their skills were required to install and service the complicated, ducted technology most readily available. The near monopoly some local companies held on certain brands reinforced the tendency to inflate price.

Overall, manufacturer emphasis on field refrigerant charging, ducted systems, specialized labor, and stringent warranty requirements created a market in which the end-user is forced to pay many times the manufacturing cost of the product in order to purchase and install it.

The room air conditioner was the first attempt to simplify the product for the end-user. Brugler proposed a system that was self-contained and pre-charged. It could be installed through a large hole cut into a wall to allow the condenser access to the exterior environment while the evaporator distributed conditioned air into the interior. The design is fundamentally sound, but has its own problems.

The requisite compact footprint of the design forced a compromise in terms of capability. The miniaturized coils and compressor condition air, but at decreased efficiency compared to traditional ducted installations. Higher energy costs in the intervening years have exacerbated the problem.

Air distribution is another problem with the room air conditioner. The through-the-wall or window installation combined with a comparably simple fan limit the design's ability to move air effectively throughout an interior environment.

Manganaro (U.S. Pat. No. 3,611,743A) essentially shows a room air conditioner, but one that is divided between a separate interior air handler and an exterior condenser. Flexible connections allowed great installation versatility and simplified installation. Unfortunately, the reliance on a standard wall outlet for power generation limited the product operating capacity. The refrigerant line coupling point was also inferior compared to conventional connections at the time and modern techniques.

Pre-charged refrigerant lines for manufactured housing were another means by which it was attempted to simplify the installation process. Rembold et al. (U.S. Pat. No. 6,662,587 B2) fabricated an invention that allowed a fixed length, pre-charged line to be quickly field-installed in a conventional, ducted split system in manufactured housing. This was innovated due to the fact that most manufactured housing was sold with an HVAC system included in the design. The standardized nature of manufactured housing allowed both the split system components and the refrigerant line to be appropriately pre-charged to adequately condition the known interior environment.

Unfortunately, this design alone is inadequate to deal with the innumerable variables found in non-manufactured housing. Stick-built homes vary tremendously in terms of architectural characteristics, requisite HVAC operating capacity, and local factors. These make it difficult or impossible to use a pre-charged line of specific length with a ducted split system.

The most sophisticated approach to simplifying HVAC technology for the end-user was the design taught by Lingrey et al. (U.S. Pat. No. 8,850,832 B2). Essentially, the design combined Rembold et al. pre-charged refrigerant line-set with Manganaro's compact split system and other modern HVAC innovations. The result is a flexible split system that can be readily installed without sophisticated training.

The downside of the Lingrey's ductless mini-split system is its reliance on a standard wall outlet for power, and its use of a locking lever-style dual-refrigerant connector. The locking lever-style connection can operate effectively, but it is prone to leaking and can be difficult to detach without suffering refrigerant loss after the connection is made. If the end-user desired to move the system and lost refrigerant in the process of disconnecting the lock lever connection, a skilled technician would be required to correctly charge the system such that it is operational.

In brief, the previous efforts to field a heat pump or air conditioner that may be easily installed by the end-user suffer a number of disadvantages, as follows:

(a) Overall energy efficiency has been a problem with many of the room air conditioner designs. Efficiency optimization was not a major consideration for HVAC products when Brugler (1969) and Manganaro (1971) created their designs, but the market has changed considerably in the intervening four decades. Federal law holds manufacturers to higher standards than in the past. Eco-conscious and cost-concerned consumers also expect HVAC products to meet certain thresholds.

(b) The principle advantage a simpler HVAC product offers the end-user is the ability to utilize air conditioning technology without being forced to handle and/or manipulate chemical refrigerants. Virtually all previous designs strive towards this paradigm, but many fall short in one way or another. Some create connection points prone to leakage while others are difficult to disengage once the line is connected to the condenser. The former defeats the purpose of the product in the first place while the latter may merely prolong the period before a skilled technician is required to service the operating system.

(c) The trend to rely on a standard electrical wall outlet to power the unit eliminates the need for an electrician to wire the system, but can drastically reduce the potential capacity any such system might produce. This significantly limits the application of such products. As some of the designs require cutting through a wall for installation, the versatility offered by reliance on a wall outlet as opposed to conventional wiring is compromised.

(d) Inadequate airflow and uneven distribution are perennial problems for room air conditioners. The ability to install in an existing window frame grants flexibility, but severely limits airflow movement in a target zone. The aforementioned reliance on a wall outlet electrical connection also limits the power available to operate the interior fan. Ineffective conditioned air control serves to limit the applications in which such a product can reasonably function.

During the conventional process of installing conduit, flexing and bending the conduit (such as a copper line-set of the present invention) into an ideal position is commonly performed. Flexible conduit tubing is designed to flex, however it is usually unable to flex near or beyond 90 degrees due to the nature of the seals of the flexible housing of the conduit tubing.

Unfortunately, conduit can be over-flexed during installation, especially by a novice, or when installation is performed in a hurry. If a section of conduit is not sized appropriately, a bend may be necessary to ensure the conduit fits within the designed space available. When flexible conduit (line-set) is bent too far, irreparable damage to the conduit occurs, often causing one or more holes in the conduit tubing. When bent to the point of breakage, the conduit must be replaced with a new conduit. This can generally occur with the self-installation of copper piping in which the installation individual bends the piping too much. In such cases, instead of the conduit bending and having a sealed tube within it, the tube is folded, which may cause breakage, or at the least, weaken the piping. This causes a problem of the conduit piping having a crimp in the bend, restricting the flow inside. A hard bend or crimp such as this can also cause holes, causing it to leak. Breakage generally occurs when an improper bending technique is used, which can cause imperceptible defects in the metal when under stress. Otherwise, with the proper technique, a metal refrigerant line can be safely bent 90 or even 180 degrees.

If there were a way by which a protective mechanism could prevent a user from bending the conduit to the point of breakage, materials could be saved, damage by water could be prevented, and installation could be simplified.

BRIEF SUMMARY

Accordingly, there is a need for a new HVAC ductless or ducted system, configured for simplified installation by an amateur that has greater efficiency than present duct-free designs on the market, has adequate airflow, is not necessarily reliant on a wall outlet for power, has line-sets which are pre-charged with chemical refrigerants, and may be controlled remotely via a WiFi connection. Such a system is preferably configured to employ quick-connect connection mechanisms equipped with a unique auto-sealing valve disposed at all connection points of the line-set. The line-sets are also equipped with preinstalled insulation, as well as a protection device configured to ensure amateur users may not over-bend the line-set during installation, compromising the line-set.

There is an additional need for the line-set of the system of the present invention to be outfitted with a conduit protection apparatus configured to ensure that installation by the amateur yields a safe and damage-free result. Such a protection apparatus is preferably present in the form of a spring-like coil which circumscribes the entirety of the line-set to prevent bends of the line-set during installation beyond a specific angular tolerance to prevent any compromise of the integrity of the line-set.

Additional needs correspond to the need to couple multiple line-sets in series between the indoor and outdoor HVAC units when one line-set isn't long enough to be connected therebetween.

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect in accordance with the embodiments disclosed herein is a method of installing an HVAC system. The method includes step (a) threadedly engaging a first end of a first pre-pressurized line-set with a condenser coolant port of a condenser unit to open respective automatic valves of the first end of the first pre-pressurized line-set and the condenser coolant port to enable fluid communication between the first pre-pressurized line-set and the condenser unit. The method further includes step (b) threadedly engaging a second end of the first pre-pressurized line-set with a first end of a pre-pressurized coupler to open respective automatic valves of the second end of the first pre-pressurized line-set and the first end of the pre-pressurized coupler to enable fluid communication between the first pre-pressurized line-set and the pre-pressurized coupler. The method further includes step (c) threadedly engaging a first end of a second pre-pressurized line-set with an air handler coolant port of an air handler unit to open respective automatic valves of the first end of the second pre-pressurized line-set and the air handler coolant port to enable fluid communication between the second pre-pressurized line-set and the air handler unit. The method still further includes step (d) threadedly engaging a second end of the second pre-pressurized line-set with a second end of the pre-pressurized coupler to open respective automatic valves of the second end of the second pre-pressurized line-set and the second end of the pre-pressurized coupler to enable fluid communication between the second pre-pressurized line-set and the pre-pressurized coupler.

In certain embodiments in accordance with this aspect, step (a) of the method may further comprise maintaining the automatic valve of the second end of the first pre-pressurized line-set in a closed position when step (a) is performed prior to step (b).

In certain embodiments in accordance with this aspect, step (b) of the method may further comprise maintaining the automatic valve of the second end of the pre-pressurized coupler in a closed position when step (b) is performed prior to step (d).

In certain embodiments in accordance with this aspect, step (c) of the method may further comprise maintaining the automatic valve of the second end of the second pre-pressurized line-set in a closed position when step (c) is performed prior to step (d).

In certain embodiments in accordance with this aspect, step (d) of the method may further comprise maintaining the automatic valve of the first end of the pre-pressurized coupler in a closed position when step (d) is performed prior to step (b).

In certain embodiments in accordance with this aspect, the method may further comprise maintaining the automatic valves of each of the condenser unit, the air handler unit, the pre-pressurized coupler, and the first and second pre-pressurized line-sets in respective closed positions prior to engagement; and returning the automatic valves to the respective closed positions from respective open positions upon disengagement.

In certain embodiments in accordance with this aspect, the method may further comprise, during steps (a-d), maintaining a common fluid pressure for coolant fluid contained within each of the condenser unit, the air handler unit, the pre-pressurized coupler, and the first and second pre-pressurized line-sets.

In certain embodiments in accordance with this aspect, the method may further comprise moving a sleeve of one of the respective automatic valves to an open position during at least one of steps (a-d).

In certain embodiments in accordance with this aspect, the method may further comprise moving a valve stem and valve head of a different one of the respective automatic valves to an open position during at least one of steps (a-d).

Another aspect in accordance with the embodiments disclosed herein is an HVAC system configured for non-professional installation. The HVAC system comprises an indoor unit, an outdoor unit, a first pre-charged refrigerant line-set, a second pre-charged refrigerant line-set, and a line-set coupler. The indoor unit is positioned inside a location of installation. The indoor unit includes at least one indoor unit refrigerant port. The outdoor unit is positioned outside the location of installation. The outdoor unit includes at least one outdoor unit refrigerant port. The first pre-charged refrigerant line-set includes a first line-set proximal end, a first line-set distal end, and a first line-set length defined between the first line-set proximal end and the first line-set distal end. The first line-set proximal end is couplable to the at least one indoor unit refrigerant port of the indoor unit. The first line-set distal end is configured to extend along a run path toward the outdoor unit. The run path includes a run path length defined between the indoor unit and the outdoor unit. The first line-set length is less than the run path length. The second pre-charged refrigerant line-set includes a second line-set proximal end, a second line-set distal end, and a second line-set length defined between the second line-set proximal end and the second line-set distal end. The second line-set proximal end is couplable to the at least one outdoor unit refrigerant port of the outdoor unit. The second line-set distal end configured to extend along the run path toward the indoor unit. The second line-set length is less than the run path length. The line-set coupler is couplable at a first coupler end to the first line-set distal end and is couplable at a second coupler end to the second line-set distal end. Each of the indoor unit, the outdoor unit, the first pre-charged refrigerant line-set, the second pre-charged refrigerant line-set, and the line-set coupler contain a pre-pressurized refrigerant, which is exclusively contained therein prior to connecting two or more of the indoor unit, the outdoor unit, the first pre-charged refrigerant line-set, the second pre-charged refrigerant line-set, and the line-set coupler together.

In certain embodiments in accordance with this aspect, each of the first line-set proximal end, the first line-set distal end, the second line-set proximal end, and second line-set distal end may include a respective automatic valve of a first valve type. Additionally, each of the at least one indoor unit refrigerant port, the at least one outdoor unit refrigerant port, the first coupler end, and the second coupler end may include a respective automatic valve of a second valve type.

In certain embodiments in accordance with this aspect, both the automatic valve of the first valve type and the automatic valve of the second valve type may be biased toward a closed configuration, respectively. Additionally, the automatic valve of the first valve type may be configured to engage the automatic valve of the second valve type to position both the automatic valve of the first valve type and the automatic valve of the second valve type in an open configuration, respectively.

In certain embodiments in accordance with this aspect, the automatic valve of the first valve type comprises a female quick connect connector that includes a first valve passageway, a shaft seat, a rod, a rod head, a sleeve, an O-ring, and a first return spring. The first valve passageway may be communicatively linked between an inner first valve opening and an outer first valve opening. The shaft seat may be fixedly coupled within the first valve passageway nearer to the inner first valve opening than to the outer first valve opening. The rod may be fixedly coupled to the shaft seat and extending toward the outer first valve opening. The rod may have a rod diameter. The rod head may be disposed on the rod distally to the shaft seat. The rod head may have a rod head diameter that is greater than the rod diameter. The sleeve may be positioned within the first valve passageway between the shaft seat and the rod head. The sleeve may have an inner sleeve diameter that is less than the rod head diameter. The O-ring may be disposed within an O-ring groove of the sleeve. The O-ring may be configured to maintain contact between the sleeve and the first valve passageway. The first return spring may be disposed between the shaft seat and the sleeve. The first return spring may be configured to apply a force to the sleeve such that the sleeve is in contact with the rod head for closing the outer first valve opening of the first valve passageway. In accordance with this aspect, upon connection of the automatic valve of the first valve type with the automatic valve of the second valve type, the sleeve may be moved toward the inner first valve opening to thereby compress the first return spring and to open the outer first valve opening of the first valve passageway.

In certain embodiments in accordance with this aspect, the automatic valve of the second valve type comprises a male quick connect connector that includes a second valve passageway, a rear support plate, a front support plate, a valve stem, a valve head, and a second return spring. The second valve passageway may be communicatively linked between an inner second valve opening and an outer second valve opening. The second valve passageway may include a cavity portion and a receptacle portion separated by an intermediate second valve opening having an intermediate second valve opening diameter less than respective diameters of the cavity portion and the receptacle portion. The cavity portion may be positioned between the inner second valve opening and the intermediate second valve opening. The receptacle portion may be open to the outer second valve opening. The rear support plate may be fixedly coupled to the second valve passageway closer to the inner second valve opening than to the intermediate second valve opening. The front support plate may be slidably received by the second valve passageway closer to the intermediate second valve opening than to the inner second valve opening. The valve stem may be fixedly coupled to the front support plate and slidably received through the rear support plate. The valve head may be disposed on the valve stem distally to the rear support plate. The valve head may have a valve head diameter that is greater than the intermediate second valve opening diameter. The second return spring may be disposed between the rear support plate and the front support plate. The second return spring may be configured to apply a force to the front support plate such that the valve head is in contact with the intermediate second valve opening to thereby close the intermediate second valve opening of the second valve passageway. In accordance with this aspect, upon connection of the automatic valve of the second valve type with the automatic valve of the first valve type, the valve head may be moved toward the inner second valve opening to thereby compress the second return spring and to open the intermediate second valve opening of the second valve passageway.

In certain embodiments in accordance with this aspect, the receptacle portion that is open to the outer second valve opening may include a 90-degree support rim defined circumferentially about the intermediate second valve opening. In accordance with this aspect, upon connection of the automatic valve of the first valve type with the automatic valve of the second valve type, the 90-degree support rim of the automatic valve of the second valve type may act upon the sleeve of the automatic valve of the first valve type to open the automatic valve of the first valve type, and the rod head of the automatic valve of the first valve type may act upon the valve head of the automatic valve of the second valve type to open the automatic valve of the second valve type.

In certain embodiments in accordance with this aspect, the automatic valve of the first valve type may include a rod and a sleeve. The rod may be fixedly coupled to a shaft seat within the automatic valve of the first valve type. The rod may include a rod head positioned distally to the shaft seat. The sleeve may be configured to selectively abut the rod head for opening and closing the automatic valve of the first valve type. The automatic valve of the second valve type may include a valve stem slidably coupled within the automatic valve of the second valve type. The valve stem may include a valve head configured to selectively abut a second valve opening for opening and closing the automatic valve of the second valve type. The automatic valves of the first and second type may be biased toward a closed position. The rod head may be configured to interact with the valve head to open the automatic valve of the second valve type while simultaneously the sleeve is configured to interact with a 90-degree support rim of the automatic valve of the second valve type to open the automatic valve of the first valve type. The 90-degree support rim may be defined circumferentially about the second valve opening.

In certain embodiments in accordance with this aspect, each of the first line-set proximal end, the first line-set distal end, the second line-set proximal end, and second line-set distal end may include a respective interiorly threaded portion. Likewise, each of the at least one indoor unit refrigerant port, the at least one outdoor unit refrigerant port, the first coupler end, and the second coupler end may include an exteriorly threaded portion configured to engage the interiorly threaded portion of one of the first line-set proximal end, the first line-set distal end, the second line-set proximal end, or second line-set distal end.

In certain embodiments in accordance with this aspect, a total of the first pre-charged refrigerant line-set length and the second pre-charged refrigerant line-set length may be greater than or equal to the run path length.

Another further aspect in accordance with the embodiments disclosed herein is a line-set coupler (or a coupler system) for an HVAC system comprising a pre-pressurized line-set coupler operable to couple a first pre-pressurized line-set to a second pre-pressurized line-set without leaking any coolant contained in any of the pre-pressurized line-set coupler, the first pre-pressurized line-set, or the second pre-pressurized line-set. The pre-pressurized line-set coupler includes a first end, a second end, a coupler length, a coupler diameter, and an interior portion. The first end may have a first automatic valve contained therein. The second end may have a second automatic valve contained therein. The coupler length may be at least three times greater that the coupler diameter. The interior portion may be positioned between the first and second automatic valves. Furthermore, the interior portion may contain a pre-pressurized coolant or refrigerant.

In certain embodiments in accordance with this aspect, the first and second automatic valves may be of a first valve type. The first and second automatic valves may be configured to engage with respective automatic valves contained in respective ends of the first and second pre-pressurized line-sets. The automatic valves contained in the respective ends of the first and second pre-pressurized line-sets may be of a second valve type.

BRIEF DESCRIPTION OF THE SEVERAL VIEWS OF THE DRAWINGS

FIG. 6A depicts a flow chart detailing the process of installation of the indoor unit of the system of the present invention by an amateur.

FIG. 25 illustrates an enlarged cross-sectional front elevation view a male quick-connect connector of the HVAC system of FIG. 19 in a closed configuration.

FIG. 26 illustrates an enlarged cross-sectional front elevation view the male quick-connect connector of FIG. 25 in an open configuration.

DETAILED DESCRIPTION

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 10:
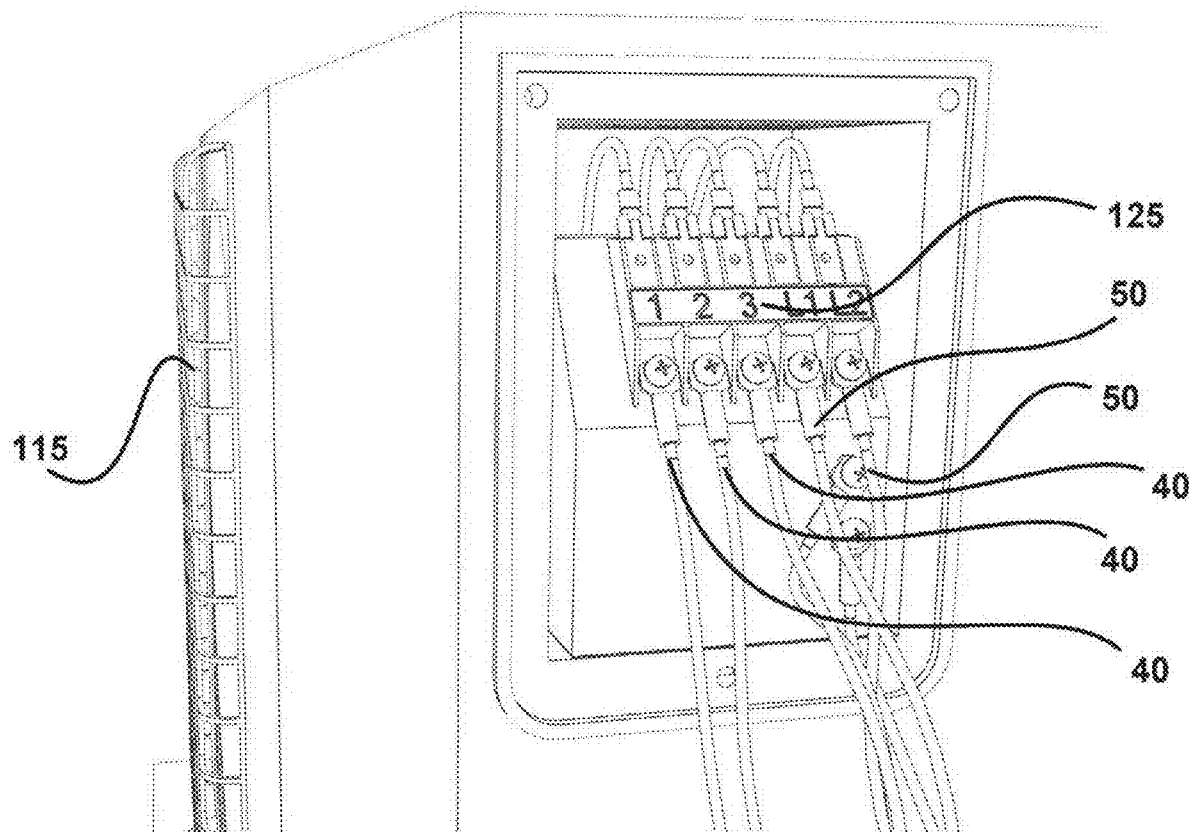
FIG. 10 displays a perspective view of electrical wire connecting ductless HVAC condenser to an exterior breaker box.

The present invention is a ductless HVAC system configured for simplified installation by an amateur without an HVAC license or certification. The system of the present invention includes an indoor unit (10) and an outdoor unit (20). The indoor unit (10) is in communication with the outdoor unit (20) via pre-charged refrigerant piping, referenced as pre-charged line-sets (30), and signal cables (40), configured to connect to at least one connection point (125) of the outdoor unit (20), also referenced as a terminal block (78). The pre-charged line-sets (30) may also be referred to herein as pre-charged refrigerant piping (30), pre-pressurized refrigerant piping (30), pre-pressurized line-sets (30), or the like. There are preferably three signal cables (40), labeled as 1, 2, and 3 in FIG. 10. There are preferably two power cables (50), labeled L1 and L2 in FIG. 10. The connection points (125) may be equipped with different labels depending on the power supply to which they are to be installed (i.e. 115v or 208/230v).

In short, when packaged, the system and apparatus of the present invention is preferably bundled with the following components:

the indoor unit (10), the outdoor unit (20), a mounting plate (60), screws, a remote control (80), pre-charged line-sets (30), an air freshening filter (35), a drain joint, and user manuals.

An optional remote control holder (15) may also be included in some embodiments of the present invention, which is configured to hold a remote control (80) designed to enable users to control the airflow and temperature as desired.

Figure 1:
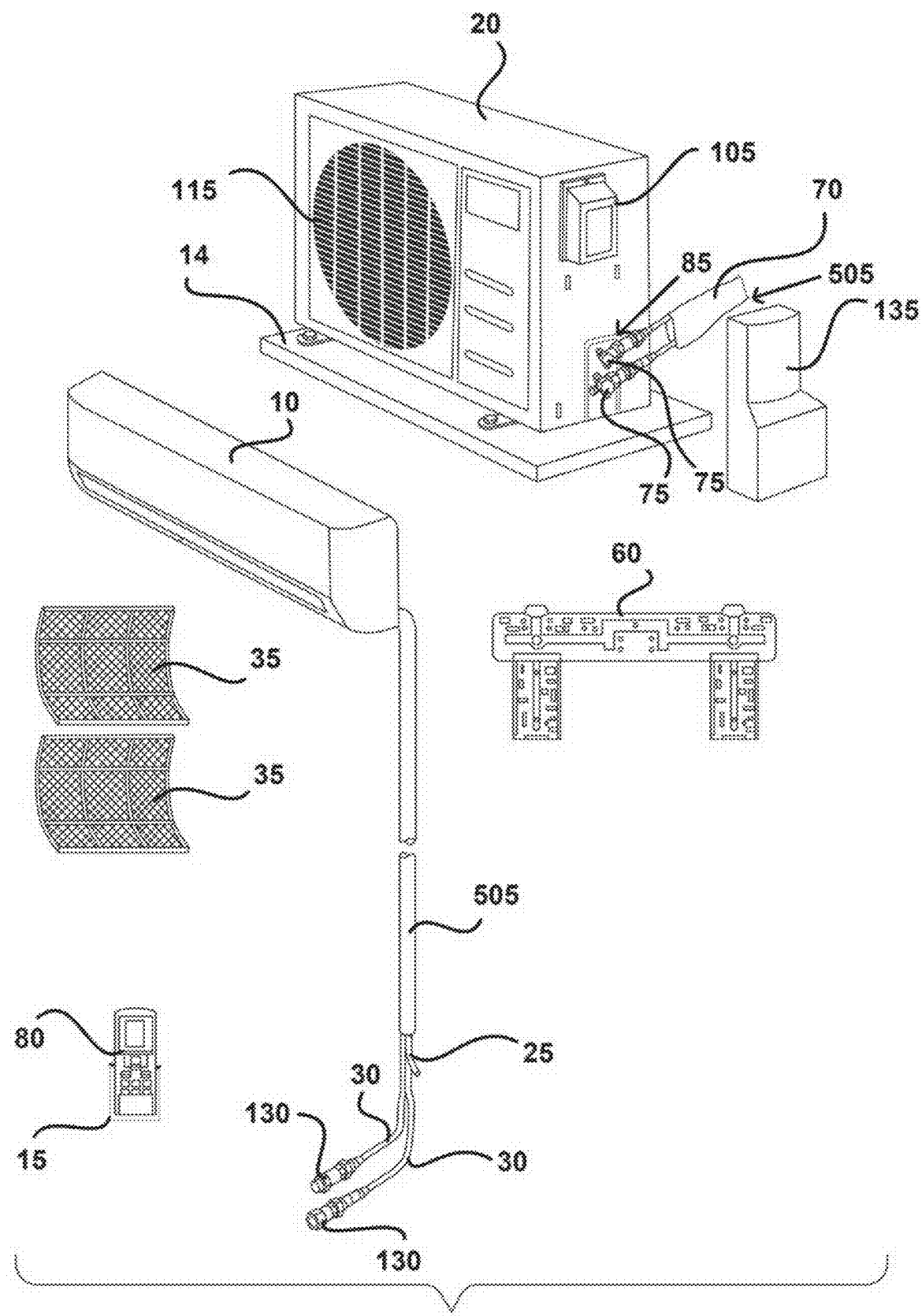
FIG. 1 shows a cross-section of a ductless HVAC system installed with an interior air handling unit connected via line-sets to an exterior condenser unit in accordance with one embodiment.
Figure 2:
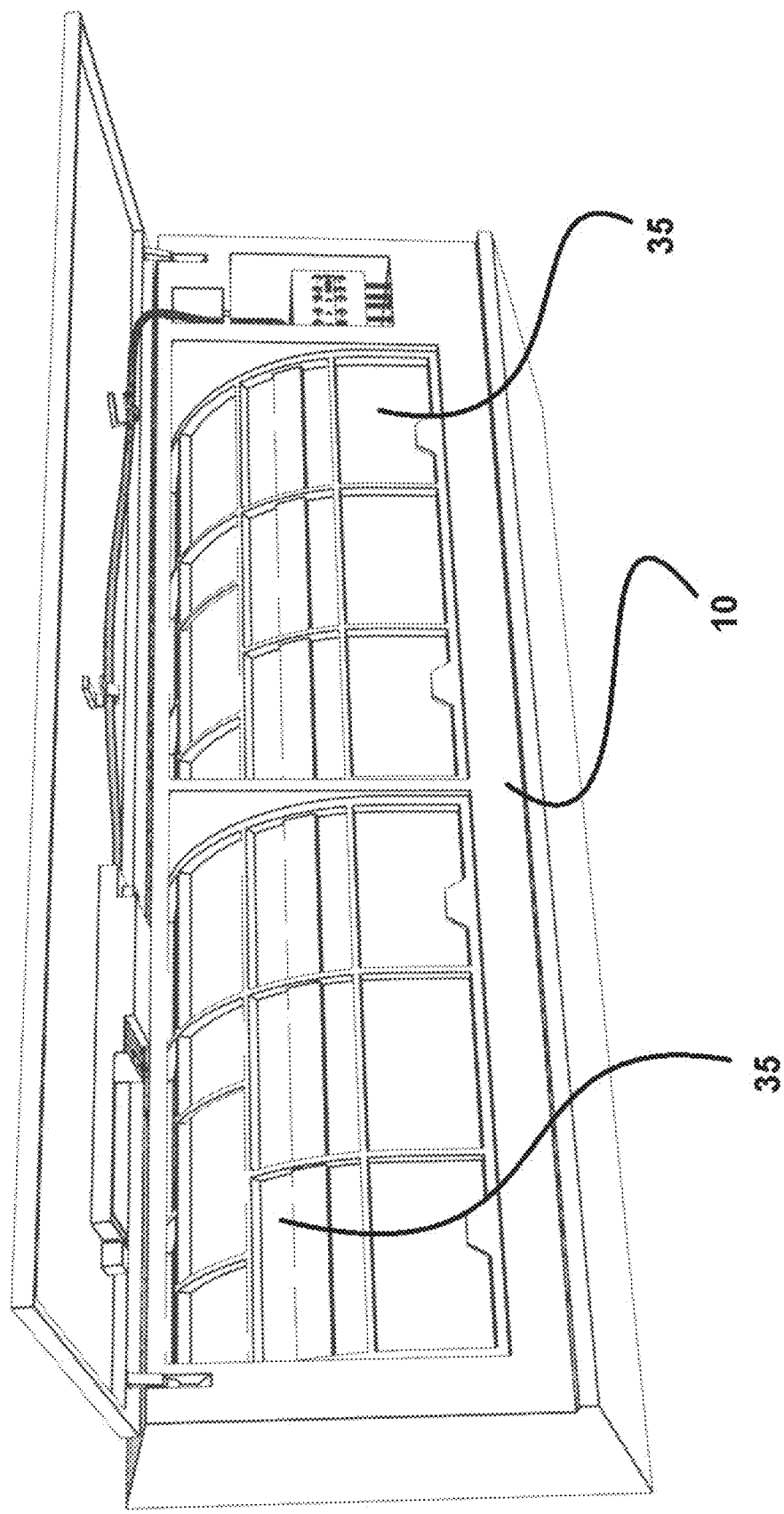
FIG. 2 shows a ductless air handling unit installed on an interior wall in accordance with one embodiment of the present invention.
Figure 3:
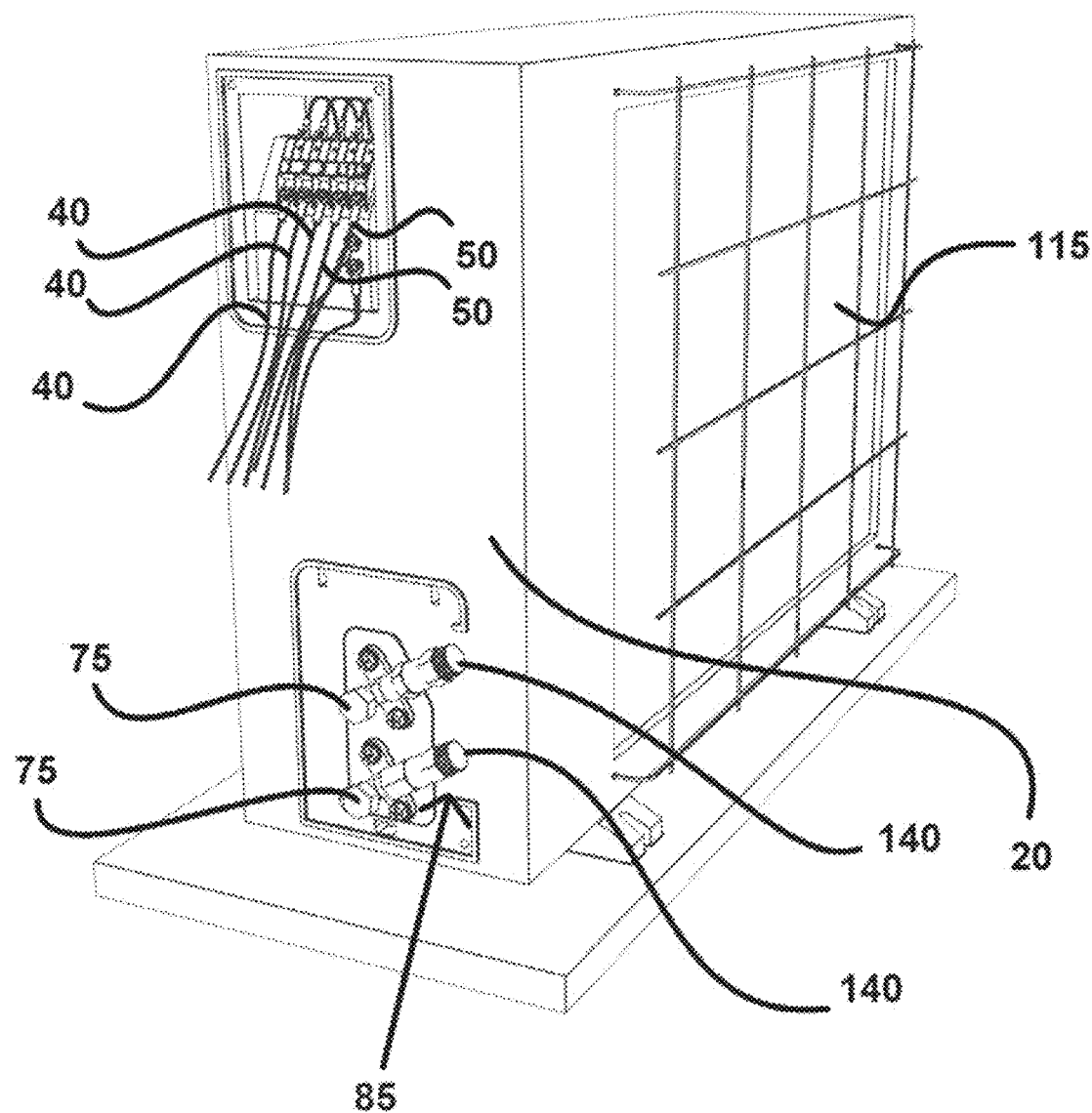
FIG. 3 shows a partial view of the condenser's electrical and refrigerant connections in accordance with one embodiment of the present invention.
Figure 4:
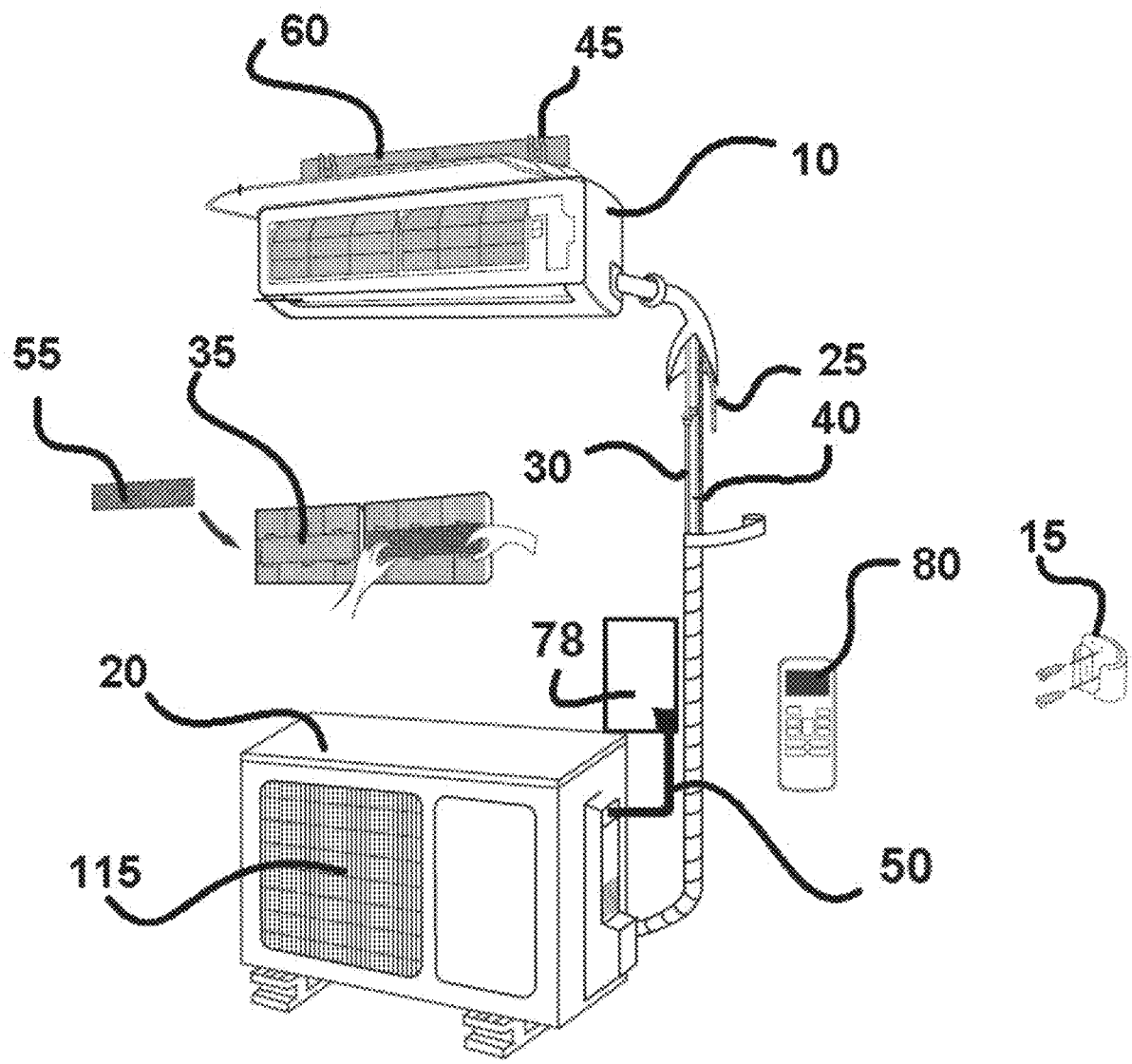
FIG. 4 depicts a front view of the system of the present invention assembled and connected, without showing the structure of the building or wall for clarity.
Figure 5:
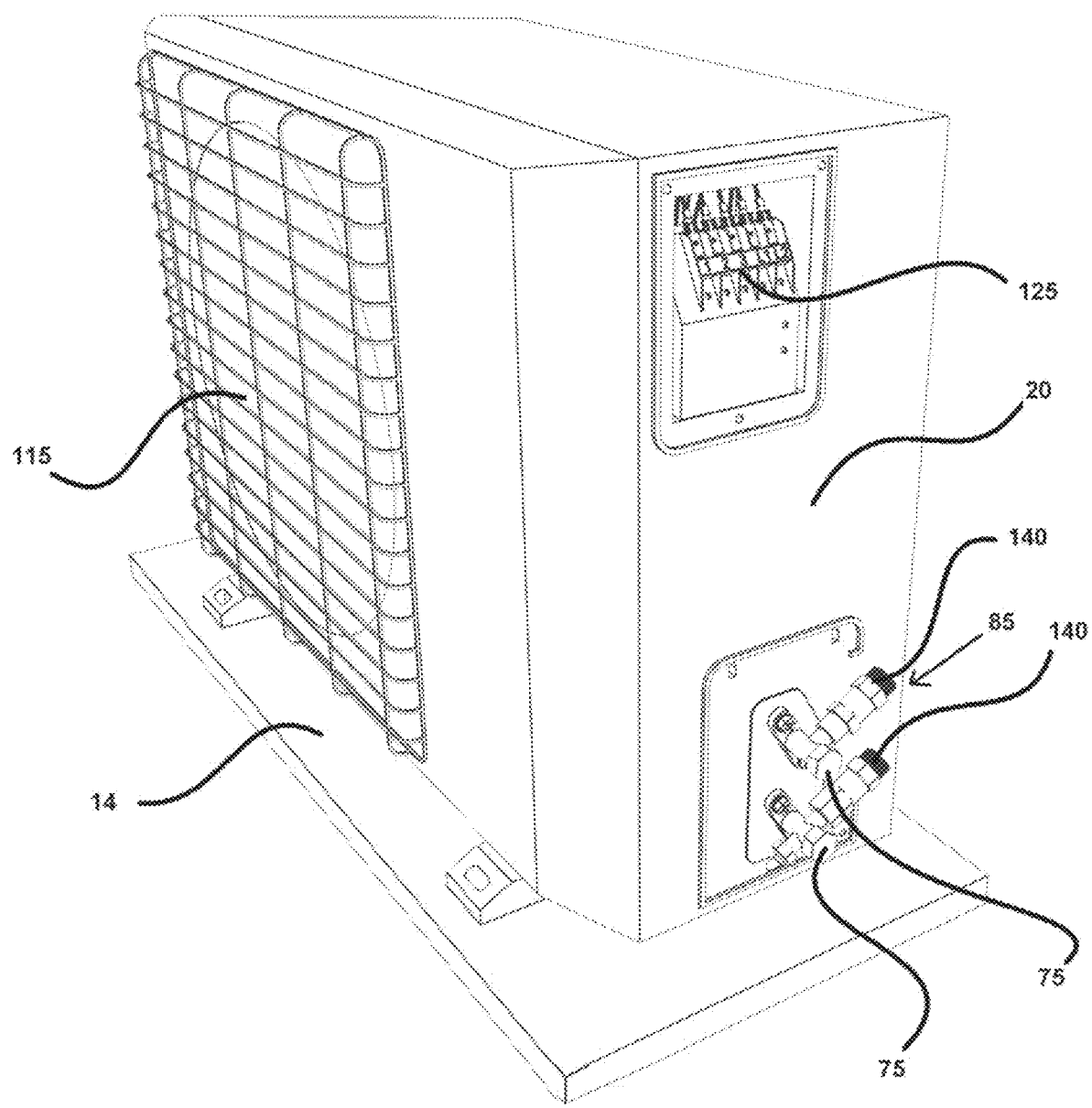
FIG. 5 displays a ductless condenser installed on the exterior ground in accordance with one embodiment of the present invention.

The system of the present invention is preferably equipped with a ductless HVAC condenser, a mounting plate (60), a condenser grill (115), and a condenser electrical cover (105). The condenser grill (115) is disposed in communication with the ductless HVAC condenser. The ductless HVAC condenser is preferably equipped with electrical wiring disposed within the condenser electrical cover, and is configured to power the system of the present invention via conventional household current. The present invention employs conventional refrigerants; however they are preinstalled to the factory recommended pressure. The ductless HVAC condenser is equipped with a condenser refrigerant cover (135), which is configured to house refrigerant connection points (85) exhibiting a male quick-connect connector mechanism (140) of the present invention. The mounting plates (60) is included with the system and is employed to mount the indoor unit (10) of the system in the preferred location selected by the user as shown in FIG. 1. It should be noted that the refrigerant connection points (85) are equipped with male quick-connect connectors (140), each configured to attach to a pre-charged line-set (30). There are preferably two iterations of pre-charged line-set (30), one for a suction line and one for a liquid line, each equipped with a copper conduit pipe outfitted with the protective coil (110) wrapped around the copper conduit pipe.

As with conventional systems, an air filter (35) is preferably employed to filter the air, despite the lack of ducts of the system. Conduit cabling, in communication with a breaker box of the structure conveys power to the system via the at least one power cable (50). A drain hose (25) is disposed near a bottom of both the indoor unit (10) and the outdoor unit (20) of the present invention, and is configured to drain excess condensation of the system. The drain hose (25) may also be referred to herein as a drain pipe (25).

The present invention is unique in that no vacuum is required on the refrigerant lines, providing for installation by an amateur. Additionally, no refrigerant charging is necessary during installation, unlike conventional ducted HVAC units. Valves of the pre-charged line-set (30) (disposed at both ends of each iteration of pre-charged line-set (30), shown as female quick-connect connectors (130), as well as on the refrigerant connection points (85) themselves, shown as male quick-connect connectors (140)) are closed automatically upon disconnection, and the pre-charged line-set(s) (30) may be detached (unscrewed) to move the unit (the entire indoor unit (10) and outdoor unit (20)) after installation, maintaining the refrigerant within the system and within the pre-charged line-set (30) during transit. Unlike other conventional window units, the system of the present invention is configured to be wired directly into a breaker box, such that the production capacity may be larger than conventional ductless HVAC units that rely on a wall plug outlet, helping to better meet the needs of the end user.

A front panel of the indoor unit (10) is equipped with function buttons, which may also be controlled remotely via the remote control (80) or a connected mobile device. The function buttons include, but are not limited to an ON/OFF button, a MODE button, a COOL button, and a HEAT button. Function buttons are preferably also present on the remote control (80).

Figure 6B:
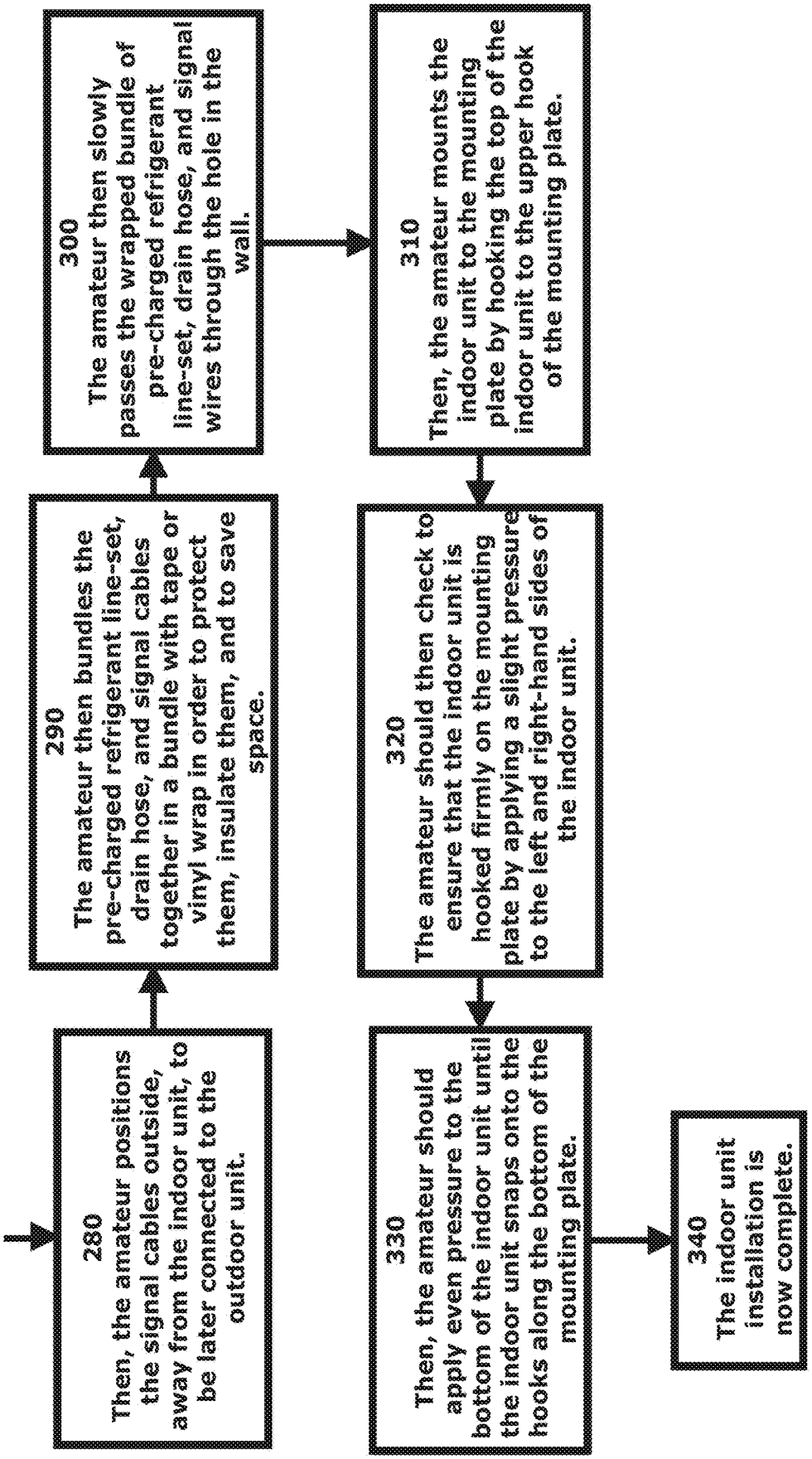
FIG. 6B is a continuation of the flow chart of FIG. 6A.

The process of installation of the indoor unit (10) of the present invention by an amateur, as shown in FIGS. 6A and 6B, is preferably as follows:

1. First, the amateur selects an installation location. (200) The amateur should ensure that the selected installation location meets the following standards: adequate air circulation, convenient drainage, noise is minimized such that it does not disturb other people, a location that is strong enough to support the weight of the indoor unit (10), a firm and solid location for the outdoor unit (20), and a location that is at least one meter away from all other electrical devices, such as a TV, radio, computer, etc.

2. Then, the amateur attaches the mounting plate (60) to the interior wall at the selected location. (210) The mounting plate is the device on which the amateur will mount the indoor unit (10) within the structure. To attach the mounting plate (60), the user removes the mounting plate (60) from the packaging of the indoor unit (10), places the mounting plate (60) against the wall in a location that meets the standards above, and then drills holes for mounting screws in locations which are equipped with studs such that they may support the weight of the indoor unit (10).

Figure 11:
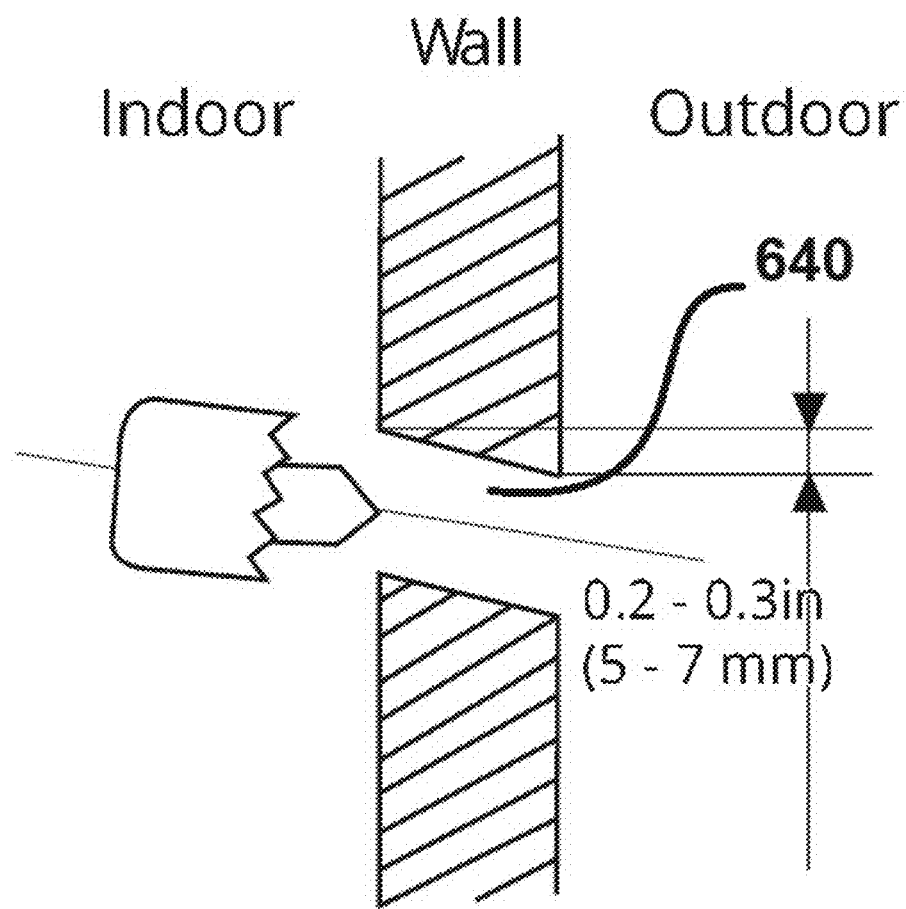
FIG. 11 exhibits a view of the ideal wall cutout required for installation of the present invention, detailing an approximate 5 mm to 7 mm decline to facilitate drainage.
Figure 12:
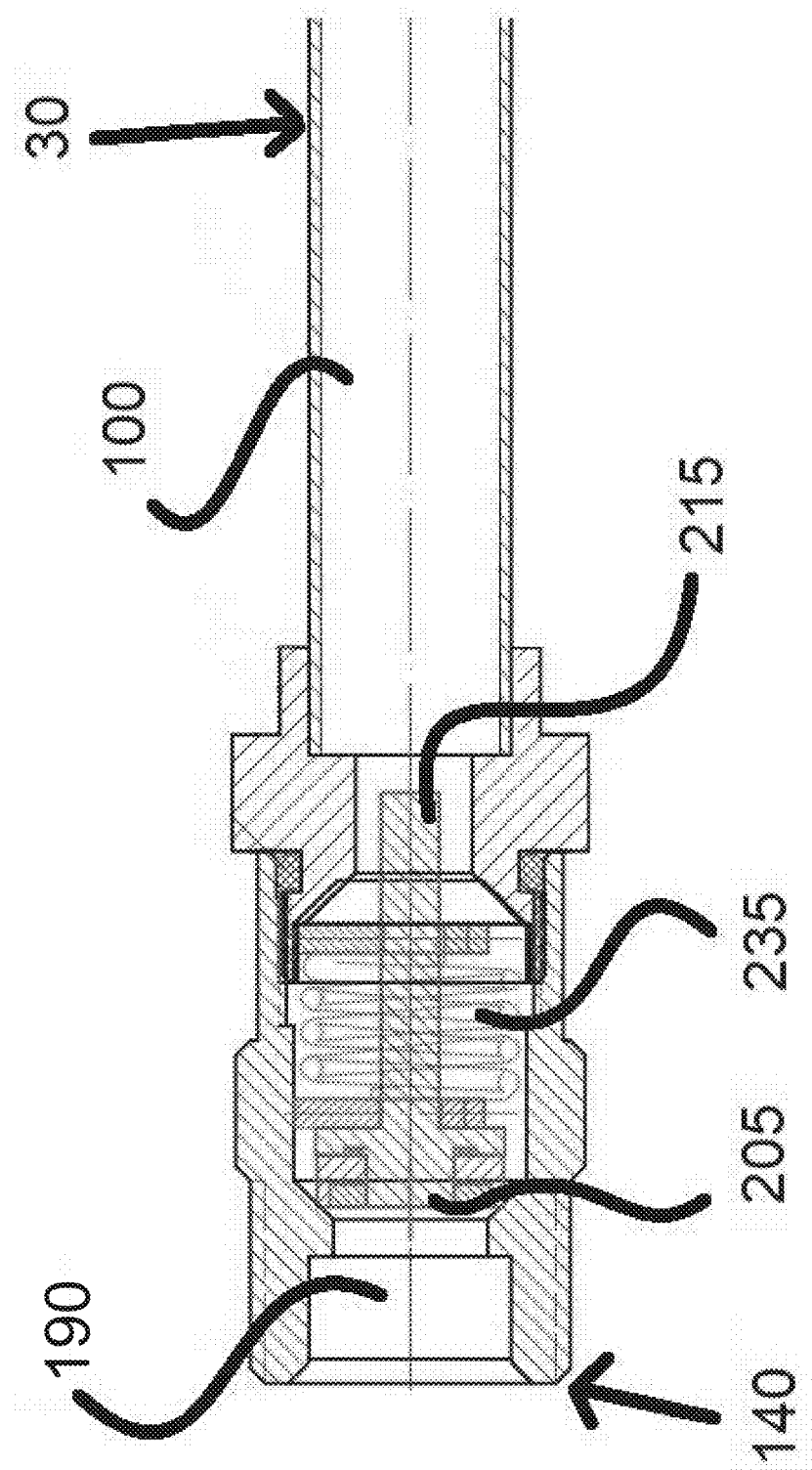
FIG. 12 depicts a cutaway close-up view of the male quick-connect connector of the present invention as seen from the side.

3. Then, the amateur drills a hole (640) in the wall for the pre-charged line-set (30), the drain hose (25), and the signal cables (40), which connects the indoor unit to the outdoor unit. (220) To do so, the amateur determines the location of the wall hole based on the position of the mounting plate. The wall hole should be at least 90 mm (3.54 inches) from the side of the unit, and at a slightly lower angle to facilitate drainage via the drain hose (25). The amateur then uses a 90 mm core drill (or similar) to drill a hole in the wall, making sure that the hole is drilled at a slight downward angle such that the outdoor end of the hole is lower than the indoor end by 5-7 mm to ensure proper water drainage. It should be noted that the amateur should be careful to avoid wires, plumbing, and other sensitive components conventionally disposed in household walls when drilling. The hole is preferably sloped five degrees from the interior of the structure to the exterior of the structure, through the wall. An example of the wall hole can be seen in FIG. 11.

4. The amateur then places a protective wall cuff into the drilled hole from the outside. (230) The protective wall cuff protects the edges of the hole (640), and will help to seal it when the amateur finishes the installation process.

5. Then, the amateur prepares the refrigerant line-set for installation by first selecting a side from which the piping will exit the indoor unit. (240) The amateur connects the refrigerant line-set to the indoor unit (10) by screwing the female quick-connect connector of the line-set onto the male connector of the indoor unit by hand. (250) Based on the position of the wall hole relative to the mounting plate, the amateur then determines the necessary angle of the piping. The amateur grips the refrigerant piping at the two ends of the bend, and slowly, with evenly applied pressure, bends the piping towards the hole. (255) The amateur should be sure to avoid denting or damaging the piping during the process. The protective coil (110) of the pre-charged line-set (30) helps to ensure the amateur does not over-bend the refrigerant piping.

6. Next, the amateur connects the drain hose to the indoor unit to the same side of the indoor unit that the refrigerant piping exits the indoor unit. (260) The amateur attaches a drain hose extension (if necessary) to the end of the drain hose. The amateur should be sure to wrap the connection point firmly with Teflon™ tape to ensure a good seal, and to prevent leaks. For the portion of the drain hose that remains indoors, the amateur should wrap it with foam pipe insulation to prevent condensation. To test the setup, the amateur should then remove the air filter from the indoor unit and pour a small amount of water into the drain pan to ensure that water flows from the indoor unit smoothly, out of the drain hose. (270)

7. Then, the amateur positions the signal cables outside, away from the indoor unit, to be later connected to the outdoor unit. (280) The signal cables (40) between the air handler (indoor unit (10)) and the condenser (outdoor unit (20)) are preferably connected to the air handler at the factory. The signal cables (40) enable communication between the indoor unit and the outdoor unit. The preferred power cable (50) for the indoor unit (10) is preferably H05VV-F or H05V2V2-F. The power cable (50) of the outdoor unit (20) is preferably a H07RN-F cable, and the signal cables (40) connecting the indoor unit (10) to the outdoor unit (20) are preferably H07RN-F cables. The installing amateur is advised to take caution, and to follow any and all electrical regulations.

Figure 9:
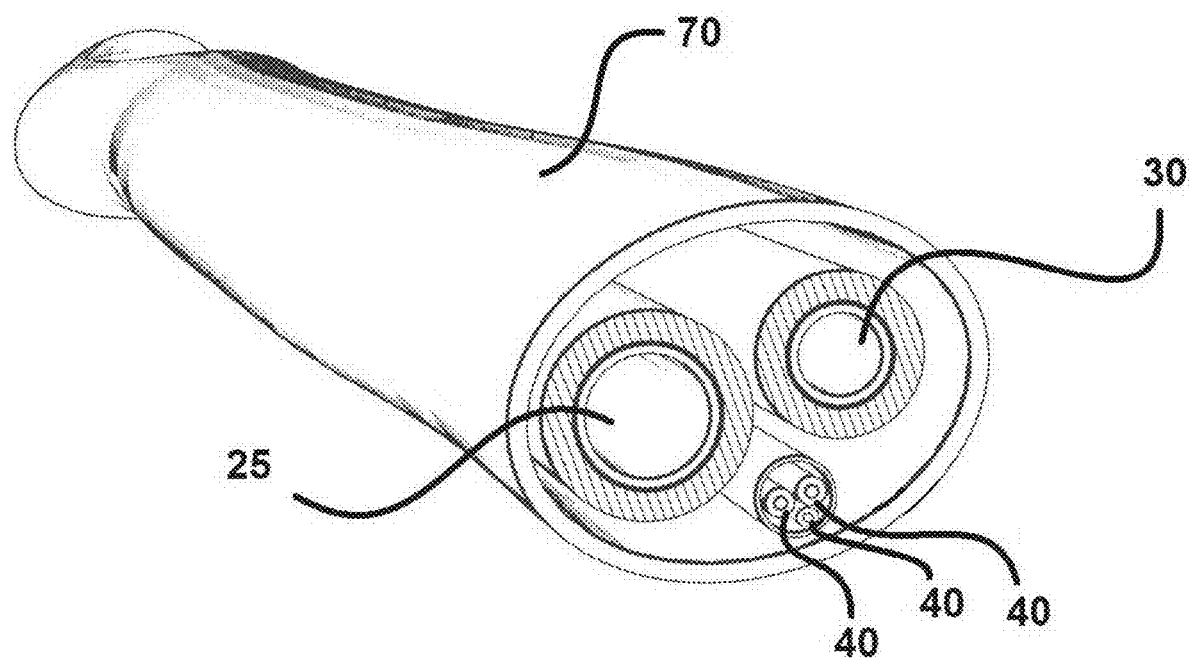
FIG. 9 show a cross-section of conduit cable with pre-charged refrigerant lines, electrical wire, and drain hose.

8. The amateur then bundles the pre-charged line-set, drain hose, and signal cables together in a bundle (505) with tape or vinyl wrap (70) in order to protect them, insulate them, and to save space. (290) The bundling can be seen in FIG. 9. The drain hose must be disposed on the bottom of the bundle, as placing the drain pipe at the top of the bundle can cause the drain pan to overflow, which can lead to fire or water damage. The vinyl wrap (70) may be present in the form of a vinyl sock which may be pre-installed onto the pre-charged line-set (30), drain hose (25) and signal cables (40) to facilitate installation by the amateur.

9. The amateur then slowly passes the wrapped bundle of pre-charged refrigerant line-set, drain hose, and signal wires through the hole in the wall. (300)

10. Then, the amateur mounts the indoor unit to the mounting plate by hooking the top of the indoor unit to the upper hook of the mounting plate. (310)

11. The amateur should then check to ensure that the indoor unit is hooked firmly on the mounting plate by applying a slight pressure to the left and right-hand sides of the indoor unit. (320) Ideally, the indoor unit should not wiggle or shift under the pressure when installed correctly and securely.

12. Then, the amateur should apply even pressure to the bottom of the indoor unit until the indoor unit snaps onto the hooks along the bottom of the mounting plate. (330) The amateur should check again that the indoor unit is firmly mounted by applying slight pressure to the indoor unit to ensure that it does not budge.

13. The indoor unit installation is now complete. (340)

Figure 7A:
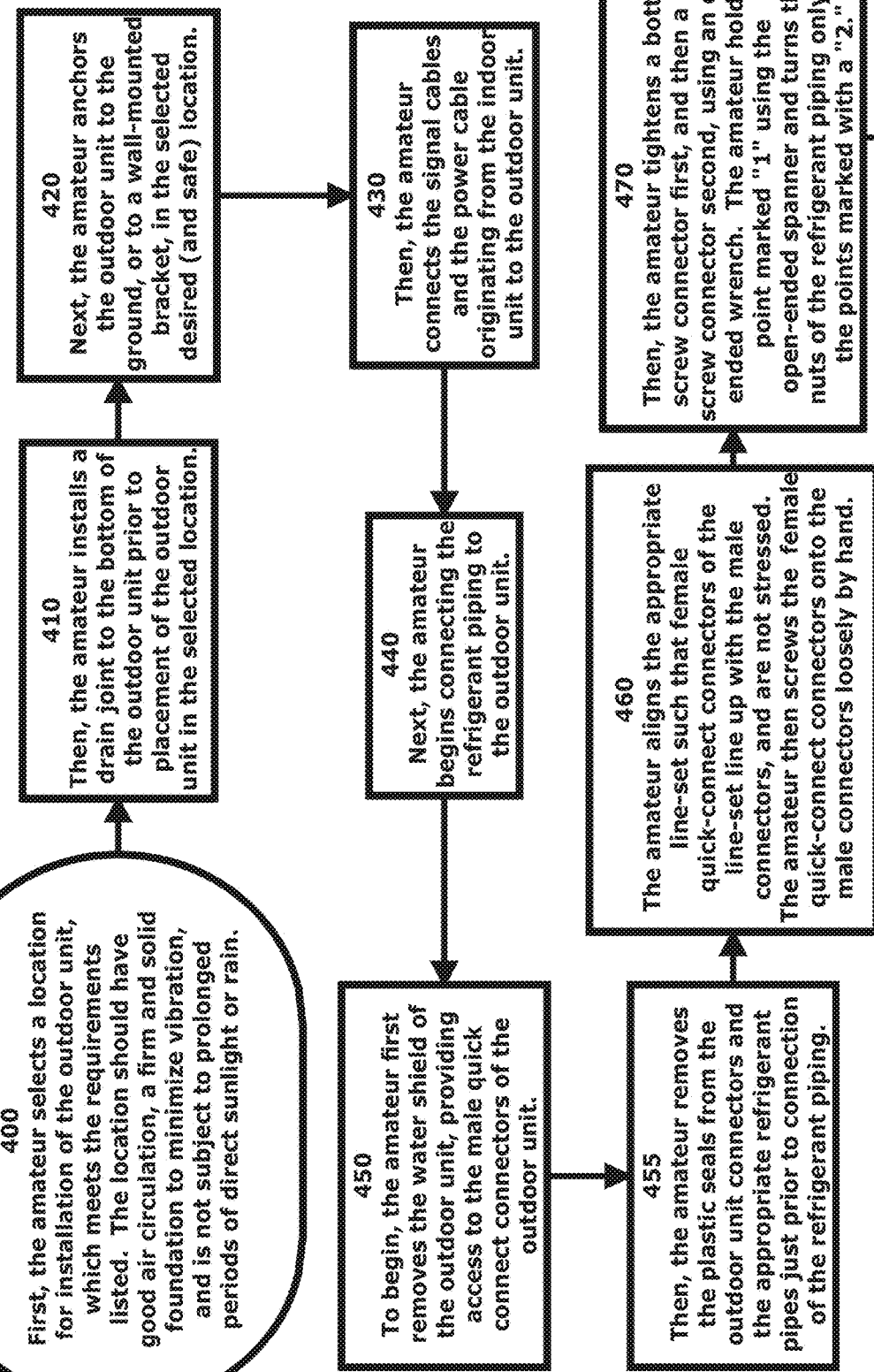
FIG. 7A details a flow chart showing the process of installation of the outdoor unit of the system of the present invention by an amateur.
Figure 7B:
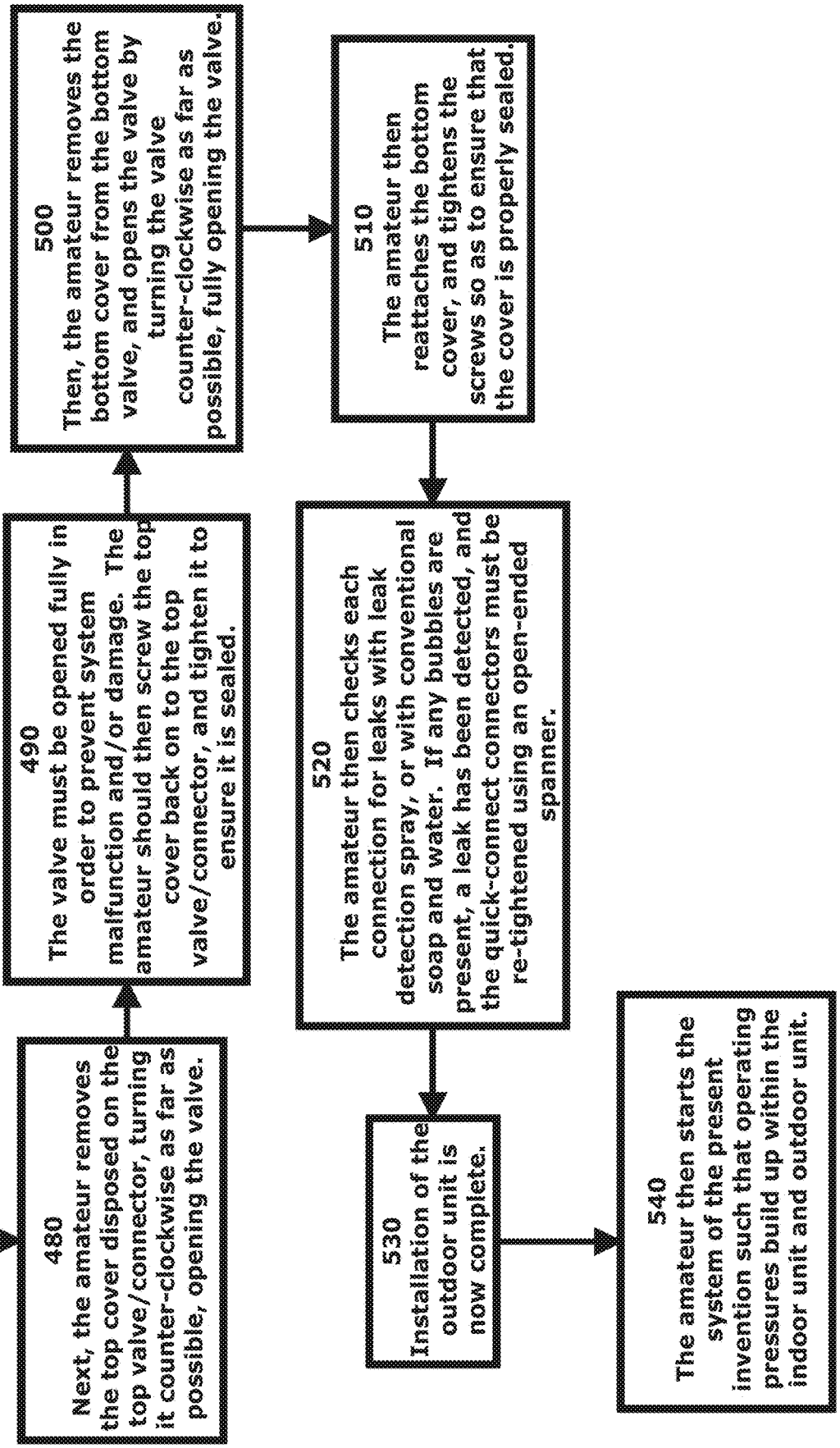
FIG. 7B is a continuation of the flow chart of FIG. 7A.
Figure 8:
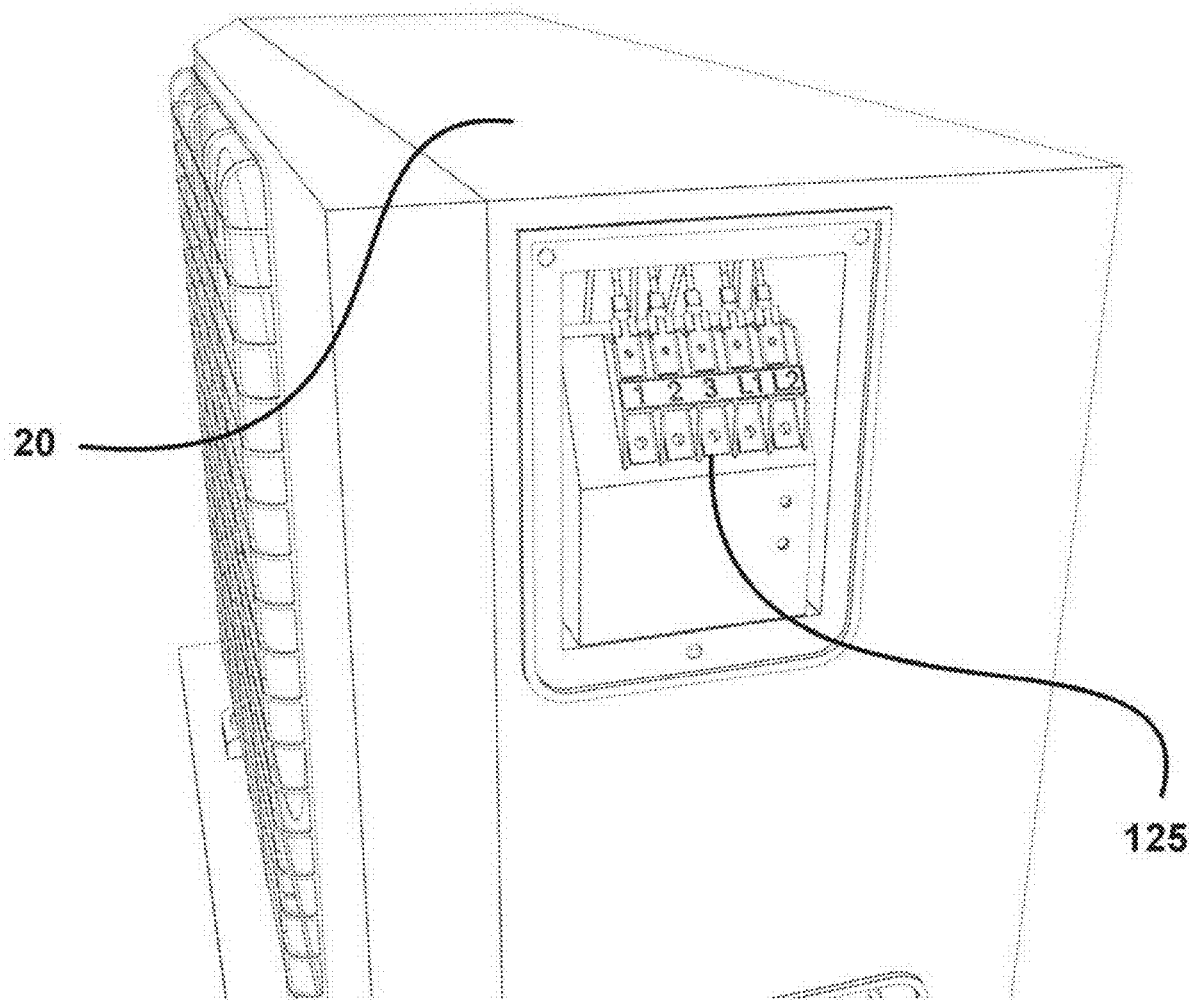
FIG. 8 is a perspective view of the electrical connections for a ductless HVAC condenser.

The installation process of the outdoor unit (20), as performed by an amateur, and as shown in FIGS. 7A and 7B is preferably as follows:

1. First, the amateur selects a location for installation of the outdoor unit, which meets the requirements listed below. Namely, the location should have good air circulation, a firm and solid foundation to minimize vibration, and is not subject to prolonged periods of direct sunlight or rain. (400) Such a foundation, shown as platform (14), may be made of concrete or similar hardened flat surface.

2. Then, the amateur installs a drain joint to the bottom of the outdoor unit prior to placement of the outdoor unit in the selected location. (410) Installation of the drain joint may require use of a rubber seal and/or a drain hose extension if needed.

3. Next, the amateur anchors the outdoor unit to the ground, or to a wall-mounted bracket, in the selected desired (and safe) location. (420) The outdoor unit may be installed to the ground, on a mounting platform, or on a wall bracket designed for ductless mini-split condensers. A concrete pad may be poured, however thick plastic pads are also conventionally used. The amateur should mark the positions for four expansion bolts used for mounting the outdoor unit to a concrete platform/foundation. The amateur drills holes for the expansion bolts into the concrete, and cleans any concrete dust away from the holes prior to placement of the expansion bolts. Per convention, the amateur places a nut on the end of each expansion bolt, and hammers the expansion bolts into the drilled holes. The amateur then removes the nuts, and places the outdoor unit onto the bolts. A washer is then placed on each expansion bolt, and the nuts are then tightened down on the expansion bolts, securing the outdoor unit to the platform. A wrench is preferably used to tighten the nuts until snug.

Figure 17:
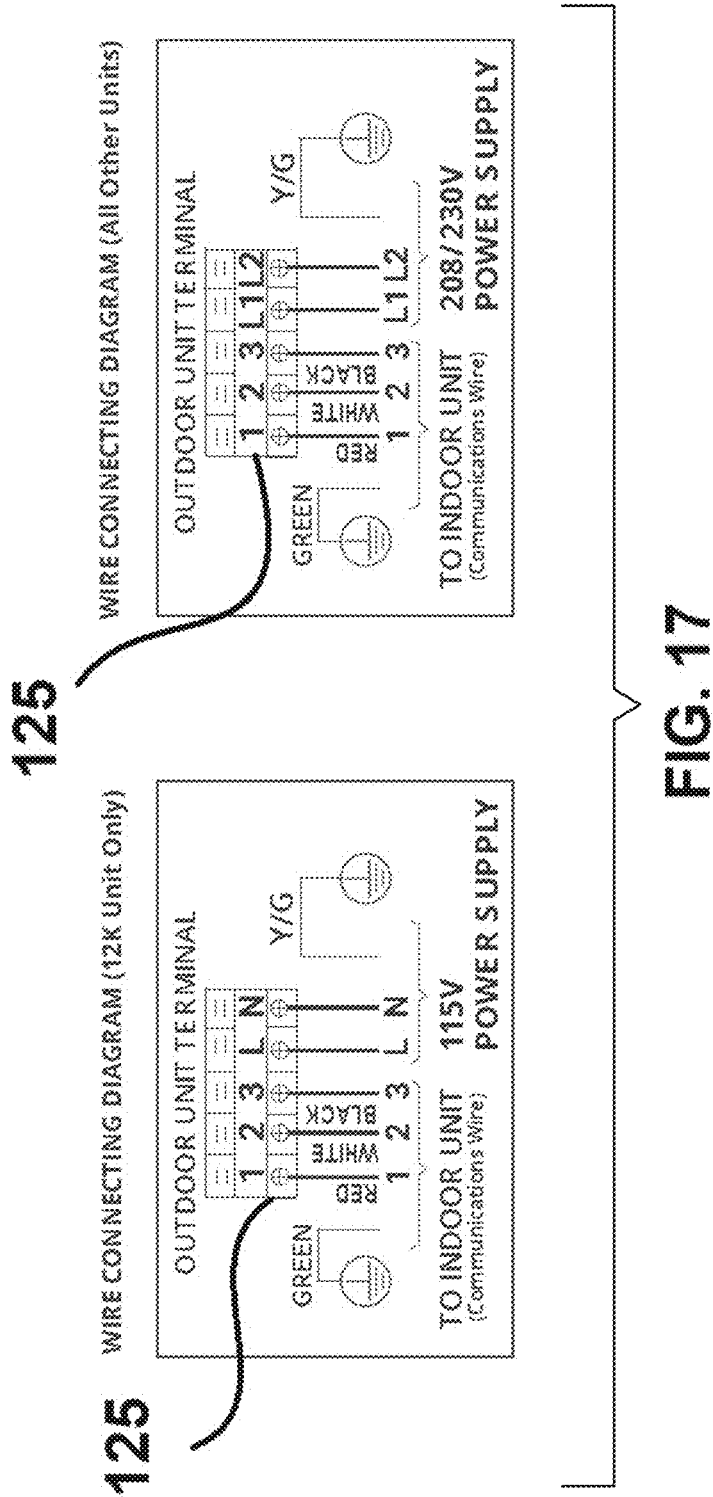
FIG. 17 displays a wiring diagram showing connections of the power cables and signal cables of the present invention to the outdoor unit.

4. Then, the amateur connects the signal cables originating from the indoor unit to the outdoor unit. (430) A terminal block is disposed on the outside unit, which is protected by an electrical wiring cover disposed on the side of the outdoor unit. A wiring diagram is preferably present on the interior of the wiring cover to facilitate proper installation. The wiring diagram may also be seen in FIG. 17, which depicts connection points (125) including those labeled 1, 2, and 3 reserved for the signal cables (40), and L1 and L2, reserved for power cable (50) connections.

5. Next, the amateur begins connecting the refrigerant piping (line-set) to the outdoor unit. (440) To facilitate connection of the refrigerant piping, the refrigerant piping ends are individually labeled, preferably with the letters 'A,' 'B,' 'C,' and 'D.' Additionally, the connectors disposed on the indoor unit and the outdoor unit are also labeled with corresponding letters. To begin, the amateur first removes the water shield of the outdoor unit, providing access to the male quick connect connectors of the outdoor unit. (450) Then, the amateur removes the plastic seals from the outdoor unit connectors and the appropriate refrigerant pipes just prior to connection of the refrigerant piping. (455) The amateur aligns the line-set such female quick-connect connectors of the line-set line up with the male connectors, and are not stressed. The amateur then screws the female quick-connect connectors onto the male connectors loosely by hand. (460) Then, the amateur tightens a bottom screw connector first, and then a top screw connector second, using an open ended wrench. The amateur holds a point marked "1" using the open-ended spanner and turns the nuts of the refrigerant piping only at the points marked with a "2." (470) It should be noted that the refrigerant pipes must be connected to the connectors on the outdoor unit with as little stress as possible. Additionally, as the coupling of the refrigerant piping employs tapping rings, the system may leak if the connection is removed and then reconnected.

6. Next, the amateur removes the top cover disposed on the top valve/connector, and turns it counter-clockwise as far as possible, opening the valve. (480) It should be noted that the valve must be opened fully in order to prevent system malfunction and/or damage. The amateur should then screw the top cover back on to the top valve/connector, and tighten it to ensure it is sealed. (490)

7. Then, the amateur removes the bottom cover from the bottom valve, and opens the valve by turning the valve counter-clockwise as far as possible, fully opening the valve. (500) The amateur then reattaches the bottom cover, and tightens the screws so as to ensure that the cover is properly sealed. (510)

8. The amateur then checks each connection for leaks with leak detection spray, or with conventional soap and water. If any bubbles are present, a leak has been detected, and the quick-connect connectors to the valves must be re-tightened using an open-ended spanner. (520)

9. Installation of the outdoor unit (20) is now complete. (530) The electrical connections should be checked one final time prior to turning the unit on. The amateur then starts the system of the present invention such that operating pressures build up within the indoor unit (10) and outdoor unit (20). (540) A final check for leaks with a leak detection spray or soap and water should be conducted after activation.

After checking for leaks during operation, the amateur should allow the system to run for at least 30 minutes. The amateur may activate the system via the on/off button on the indoor unit (10), or via the remote control (80). The amateur should press the 'MODE' button of the remote control (80) to select 'COOL,' and select the lowest possible temperature, testing the cooling of the system. Then, the amateur should press the 'MODE' button of the remote control (80) to select HEAT, and select the highest possible temperature. Each should run for approximately five minutes, during which time, the following checks should be performed (in no particular order):

Ensure the unit has remained properly grounded;
Ensure that all electrical terminals are properly covered;
Ensure that the indoor unit (10) and outdoor unit (20) are solidly installed in position;
Ensure that all pre-charged line-set (30) refrigerant connection points (85) does not leak;
Ensure that water drains properly from the drain hose (25);
Ensure that all piping has remained properly insulated;
Ensure that the system performs the COOL function properly;
Ensure that the system performs HEAT function properly;
Ensure that the indoor unit (10) louvers rotate properly;
Ensure that the indoor unit (10) responds to the input of the remote control (80).

It should be noted that the system of the present invention should not be installed in proximity to the following: near any source of heat, steam, or combustible gas, near flammable items such as curtains or clothing, near a doorway, near obstacles that may block air circulation, or in a location subject to direct sunlight. Additionally, it should be noted that if the unit is frequently exposed to heavy rain or snow, the amateur should build a shelter above the unit so as to protect it from rain or now. The amateur should be careful to not allow the shelter to obstruct air flow around the outdoor unit.

The system of the present invention uses gapped spiraled wire or reinforced acrylic polymer to compose the protective coil (110). Other sufficiently strong yet flexible materials may alternatively be employed. The gap present between sections of the protective coil (110) may vary in accordance with the diameter of the conduit tubing on which the present invention is to be used. The gauge of the spiraled wire or reinforced acrylic polymer of the present invention may also vary with the type and size of conduit on which the present invention is to be used.

Alternate embodiments of the protective coil (110) component of the present invention may include rings which are spaced to be tighter together, either by virtue of the coiling process, or by virtue of the gauge of the wire used to construct the spiraled rings (also referenced as coils). As such, the gauge of the wire may vary, specifically in accordance with the diameter of the conduit tubing. In preferred embodiments of the present invention to be installed on refrigerant piping, a form of flexible conduit tubing, 12-gauge wire is employed. However, it should be understood that other wire gauges may be used instead. The gauge of the wire is likely to vary depending on if the present invention is to be used for unitary or ductless HVAC products.

It should be understood that the apparatus of the present invention is designed to maintain proper flow and prevent breakage of conventional conduit tubing, both during installation, and thereafter. The protective coil (110) provides necessary resistance to the conduit to prevent over-flexing of the flexible conduit, namely pre-charged line-set (30). It should be understood that the protective coil (110) of the spiralized wire are circular, and that there is no specific number of coils present in the apparatus of the present invention. While there is no specific number of rings required, it should be understood that the number used need be sufficient in order to extend several inches beyond both sides of the point at which the user wishes to enact a bend in the conduit. At the point of the bend, it should be noted that the rings of the protective coil (110) are preferably concentrated, as they are slightly bunched together as a side effect of the bending process.

It should similarly be understood that the protective coil (110) of the present invention may be employed on a variety of forms of conduit outside of the pre-charged line-set (30) of the present invention with minimal modifications. The size of the coil diameter, as well as the thickness of the protective coil (110) itself may require alteration in order to facilitate use on differing forms and sizes of conduit as needed. The gauge required preferably varies in accordance with the number of spiral segments of the protective coil (110) present in the iteration of the present invention.

Additionally, it should be noted that the preferred embodiment of the present invention is equipped with a layer of insulation (120) around the wire to prevent damage including degradation and corrosion, of the apparatus when exposed to the elements. The insulation (120) is preferably treated with UV protection, and is configured to remain permanently affixed to the line-set for the life of the pre-charged line-set (30).

The system of the present invention is preferably equipped with a Bluetooth™ receiver and/or WiFi dongle, which enables the present invention to connect to, and be manipulated from, a mobile device such as a mobile phone, tablet, or smart watch. The system employs conventional pairing techniques to connect the mobile device to the system of the present invention. By this connection, the end user of the system of the present invention may manipulate the temperature of the room via his or her mobile device, without the need to use the remote control (80). Additionally, programmable settings may be introduced, such as activating the system upon entry or proximity, activating the system at a specific temperature at specific times of day/month/year, as well as deactivating the system once a temperature threshold has been reached. In such embodiments, the indoor unit (10) is preferably outfitted with a proximity sensor.

Additionally, it should be understood that three primary embodiments of the system and method of the present invention are preferably available. Namely, the difference between the three embodiments relates to the pre-charged piping (30). In a first primary embodiment, the pre-charged refrigerant piping (30) is connected to the indoor unit (10) at the factory during manufacturing, while remaining disconnected from the outdoor unit (20). In a second embodiment, the pre-charged line-set (30) is pre-connected for the amateur installer to the outdoor unit. In a third embodiment, the pre-charged line-set (30) is remains disconnected from both the indoor unit (10) and the outdoor unit (20) for packaging and shipping of the system of the present invention. It should be understood that, in all embodiments of the present invention, the refrigerant charge in the pre-charged line-set (30) is pre-balanced for installation, meaning that no additional charging is necessary during installation unlike conventional mini-split installations.

It should also be understood that the pre-charged line-set (30) of the present invention is equipped with internal quick-release valves referenced as female quick-connect connectors (130), which are designed to open upon proper seating of the pre-charged line-set (30) to male quick-connect connectors (140) disposed on the indoor unit (10) and outdoor unit (20), two valves per pre-charged line-set (30) (one at each end of each pipe), for a total of four valves.

Figure 13:
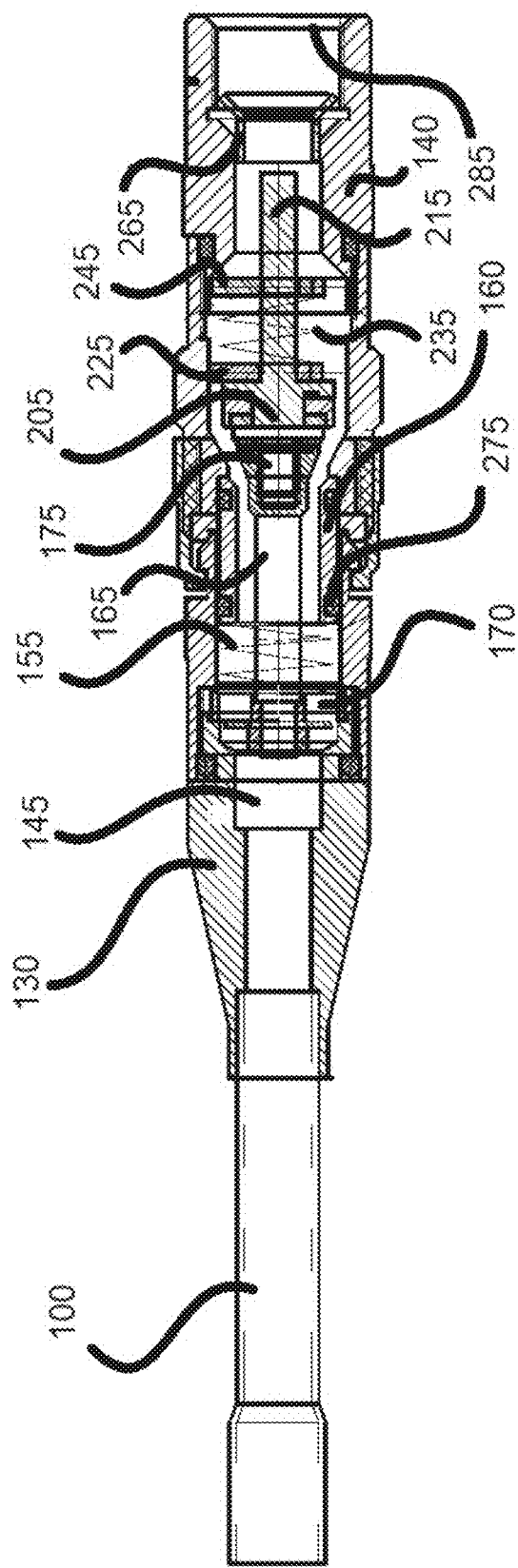
FIG. 13 depicts a side cut-away view of the female and male quick-connect connectors of the present invention shown coupled together.

Furthermore, it should be understood that the present invention includes a pre-charged line-set (30) configured for use with the aforementioned HVAC system which facilitates installation of the system by an amateur. The pre-charged line-set (30) is designed to connect to both internal and external (indoor and outdoor) units. The pre-charged line-set (30) includes a connecting pipe equipped with two female quick-connect connectors (130), one disposed on either end of the pre-charged line-set (30), which are configured to connect to male quick-connect connectors (140) disposed on both the indoor unit and outdoor unit of the HVAC system as shown connected in FIG. 13. Each female quick-connect connector (130) is equipped with a sealing locking device, present in the form of a valve head (205) in conjunction with a valve stem (215). Each male quick-connect connector (140) is equipped with an opening device configured to open the sealing device of the female quick-connect connector (130) when interfaced. It is through the use of these quick-connect fittings that the system of the present invention may be directly connected to the indoor unit (10) and outdoor unit (20) components of the HVAC system without vacuuming and therefore without requiring professional installation.

Figure 14:
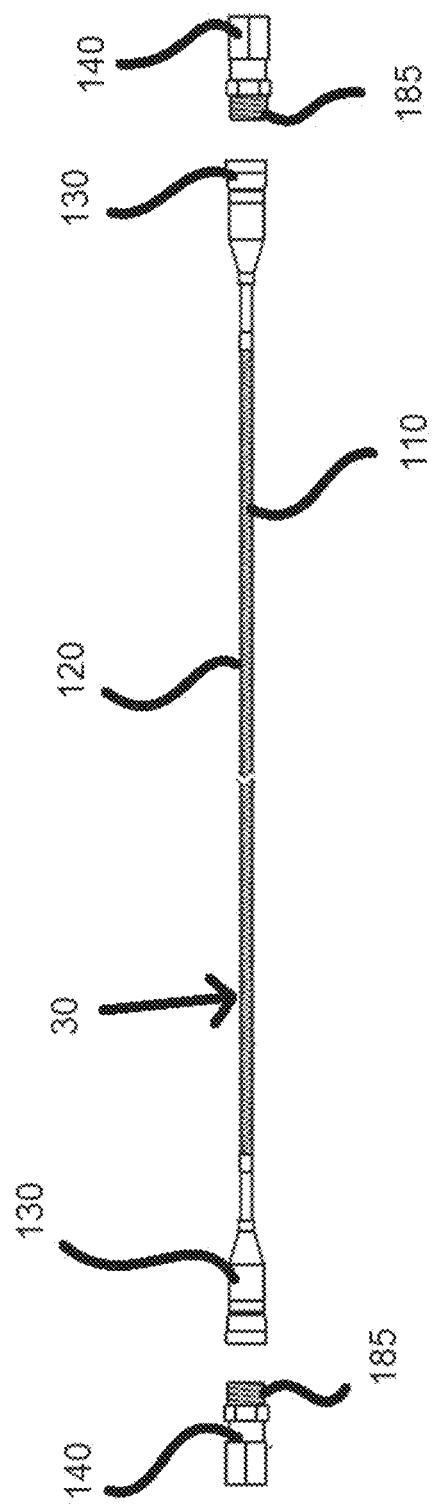
FIG. 14 exhibits a view of the entire line-set (one of two iterations) employed by the system of the present invention as seen from above.

The pre-charged line-set (30), as shown in FIG. 14, is outfitted with conventional conduit piping (100), a protective coil (110), and an insulation tube (120) circumscribing the entirety of the conduit piping (100) and the protective coil (110). Female quick-connect connectors (130) are disposed at either end of the pre-charged line-set (30), in communication with the conduit piping (100), and are equipped with a variety of features specifically designed for the containment of refrigerant within the pre-charged line-set (30) and the calculated release of the refrigerant into (and only into) the indoor and outdoor units (10, 20) of the HVAC system via mating male quick-connect connectors (140) disposed on the units themselves.

The female quick-connect connector (130) is equipped with a through hole (145) in which a seal locking device is disposed. The seal locking device includes a first return spring (155), an axle sleeve (160), and a rod (165). The axle sleeve (160) is configured to slide within the through hole (145) between an open position and return to a pressurized neutral (closed) position via force of the first return spring (155). The seal locking device of the female quick-connect connector (130) includes a shaft seat (150) disposed within the through hole (145), and is preferably fixed in position within the through hole (145). A plurality of axial holes (170) are preferably present on the shaft seat (150) which are configured to ensure uniform passage of the refrigerant through the connectors. There are preferably five small axial holes (170) present on the shaft seat (150) of the female connector. In certain optional embodiments, the rod (165) is fixed to the shaft seat (150) on a first end, and a second end of the rod (165) is equipped with a rod head (175) configured to interface with the opening device of the male quick-connect connector (140). At least one O-ring (295) is present near the rod head (175), disposed within a respective O-ring groove (275) of the axial sleeve (160), to ensure a firm seal between the through hole (145) and the axle sleeve (160) when the Axle sleeve (160) is pushed inwards, opening the seal locking device upon connection to the male quick-connect connector (140)

In contrast, the male quick-connect connector (140) is equipped with an axial through hole (190) adjacent to an opening device which is configured to facilitate the opening of a valve disposed within the male quick-connect connector (140) when mated to the female quick-connect connector (130). The opening device comprises a valve head (205), a valve stem (215) and a bracket. The bracket is formed by a front support plate (225), a second return spring (235) and a rear support plate (245), which enclose a cavity (195). One end of the valve head (205) abuts against one end of the cavity (195), and the second end of the valve head (205) is connected to the valve stem (215). The valve stem (215) is positioned such that it sequentially passes through the front support plate (225), second return spring (235) and the rear support plate (245) through openings in the front support plate (225) and rear support plate (245). The front support plate (225) may be slidably coupled within the cavity (195) and fixedly coupled to the valve stem (215). The rear support plate (245) may be fixedly coupled within the cavity (195) and slidably coupled to the valve stem (215). This configuration may be configured to permit movement of the valve stem (215) while maintaining its orientation.

A flared copper cap (265) is preferably disposed in the axial through hole (190) of the male quick-connect connector (140), away from the valve head (205). The flared copper cap (265) is preferably made of soft copper tubing. The flared copper cap (265) is configured to provide a better seal when the male quick-connect connector (140) is connected with the air conditional shut-off valve, acting like a gasket for the system. Use of the flared copper cap (265) enhances the capacity of the system of the present invention to be installed by an amateur without difficulty, as without the placement of the flared copper cap (265), additional effort would be required to tighten the quick-connectors of the present invention, increasing the risk of leakage.

Figure 15:
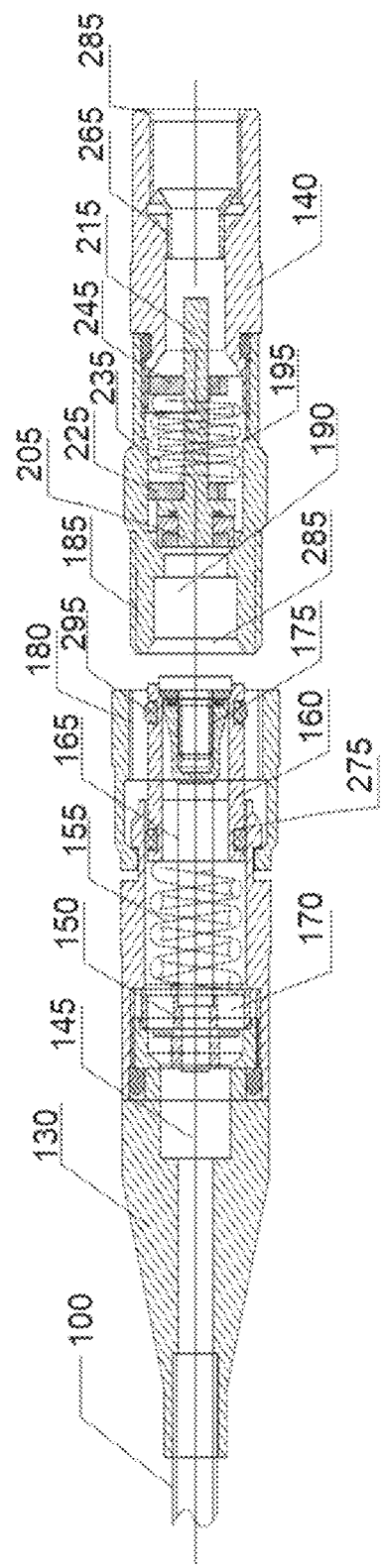
FIG. 15 shows a view of the female quick connect connector and the male quick connect connector disposed side-by-side, uncoupled.
Figure 16:
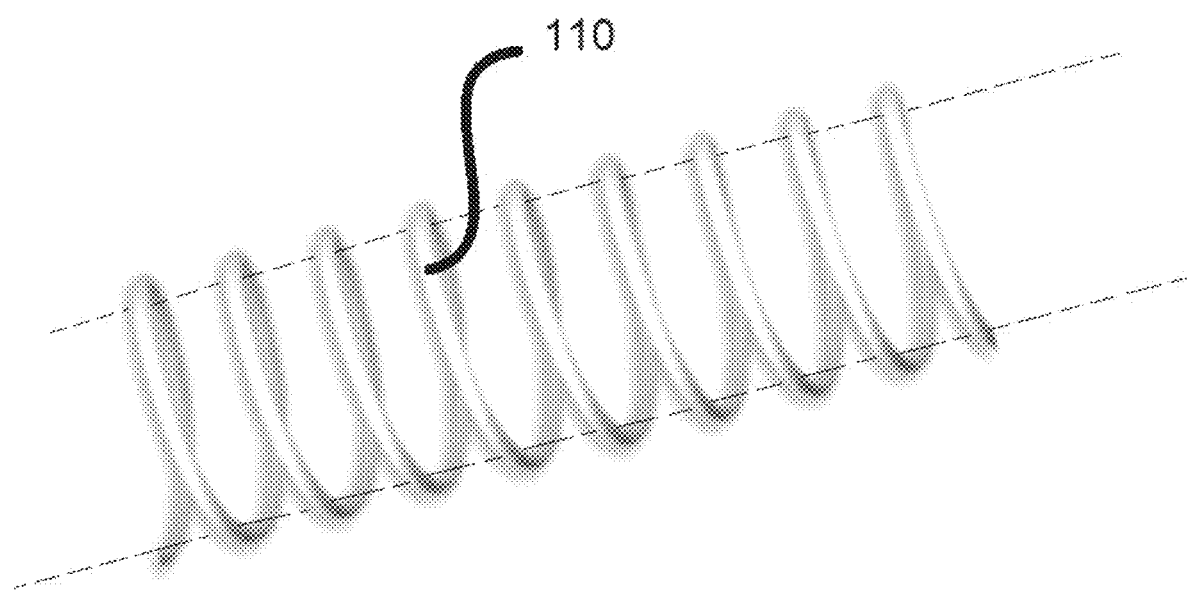
FIG. 16 shows a view of the protective coil separate from the line-set of the present invention.

As such, the male quick-connect connector (140) is configured to abut against the rod head (175) near the valve head (205) for sealing when connected to the female quick-connect connector (130). It should be understood that the valve head (205) and the front support plate (225) are slidably fitted within the cavity (195). Outer threads (185) of an outer wall of the male quick-connect connector (140) are configured to interface with inner threads (180) of the female quick-connect connector (130) when interfaced. The rod head (175) is circular and has a diameter greater than that of the rod (165) as shown in FIG. 15. The male quick-connect connector (140) is equipped with a 90 degree flaring (285) present at the tip of the male quick-connect connector (140), and is configured to facilitate the guidance of the male quick-connect connector (140) into the female quick-connect connector (130), as well as to ensure that the protruding portion (namely, the rod head (175)) of the female quick-connect connector (130) may easily move inwards towards the valve head (205) of the male quick-connect connector (140) as the axle sleeve (160) slides outward away from the rod head (175) to permit opening of the sealing mechanism of the male quick-connect connector (140) via the valve head (205), as well as to permit opening of the seal locking device of the female quick-connect connector (130) approximately simultaneously upon connection of the male quick-connect connector (140) to the female quick-connect connector (130).

It should be noted that the first return spring (155) and second return spring (235) are different springs with different force ratings. As such, the springs are not interchangeable in the manufacturing of the quick-connect connectors of the present invention. The valve of the male quick-connect connector (140) is opened by the rod (165) of the female connector, which pushes the valve head (205) of the male quick-connect connector (140) back, causing the second return spring (235) to compress. The support force of the rod (165) is greater than that of the second return spring (235). The force of the first return spring (155) of the female quick-connect connector (130) only supports the axle sleeve (160) when it enters the male quick-connect connector (140).

For clarity, it should be understood that the male quick-connect connectors (140) are equipped with the following structural components as shown in FIG. 15:
Outer Threads (185)
90 Degree flaring (285)
Axial through hole (190)
Cavity (195)
Valve head (205)
Front support plate (225)
Second return spring (235)
Rear support plate (245)
Valve stem (215)
Flared copper cap (265)

Similarly, it should be understood that the female quick-connect connectors (130) are equipped with the following structural components as shown in FIG. 15:
O-ring (295)
Inner threads (180)
Rod (165)
First return spring (155)
Axle sleeve (160)
O-ring groove (275)
Axial holes (170)
Through hole (145)
Shaft Seat (150)
Rod head (175)

Additionally, a manual valve (75) (rotating) is disposed near the refrigerant connection points (85) for the pre-charged line-set (30) on both the indoor unit and outdoor unit, for a total of four additional valves (one for each connector). In certain optional embodiments of the present invention, each pipe end is preferably labeled with a corresponding alpha-numeric character, which matches an alpha-numeric character disposed on each pre-charged refrigerant piping connection point, i.e 'A,' 'B,' 'C,' 'D,' etc. It should be understood that the manual valves (75) are only to be opened after the each female quick-connect connector (130) of the pre-charged line-set (30) are firmly seated and locked into position on the male quick-connect connectors (140) of the indoor unit (10) and outdoor unit (20) respectively.

Figure 18:
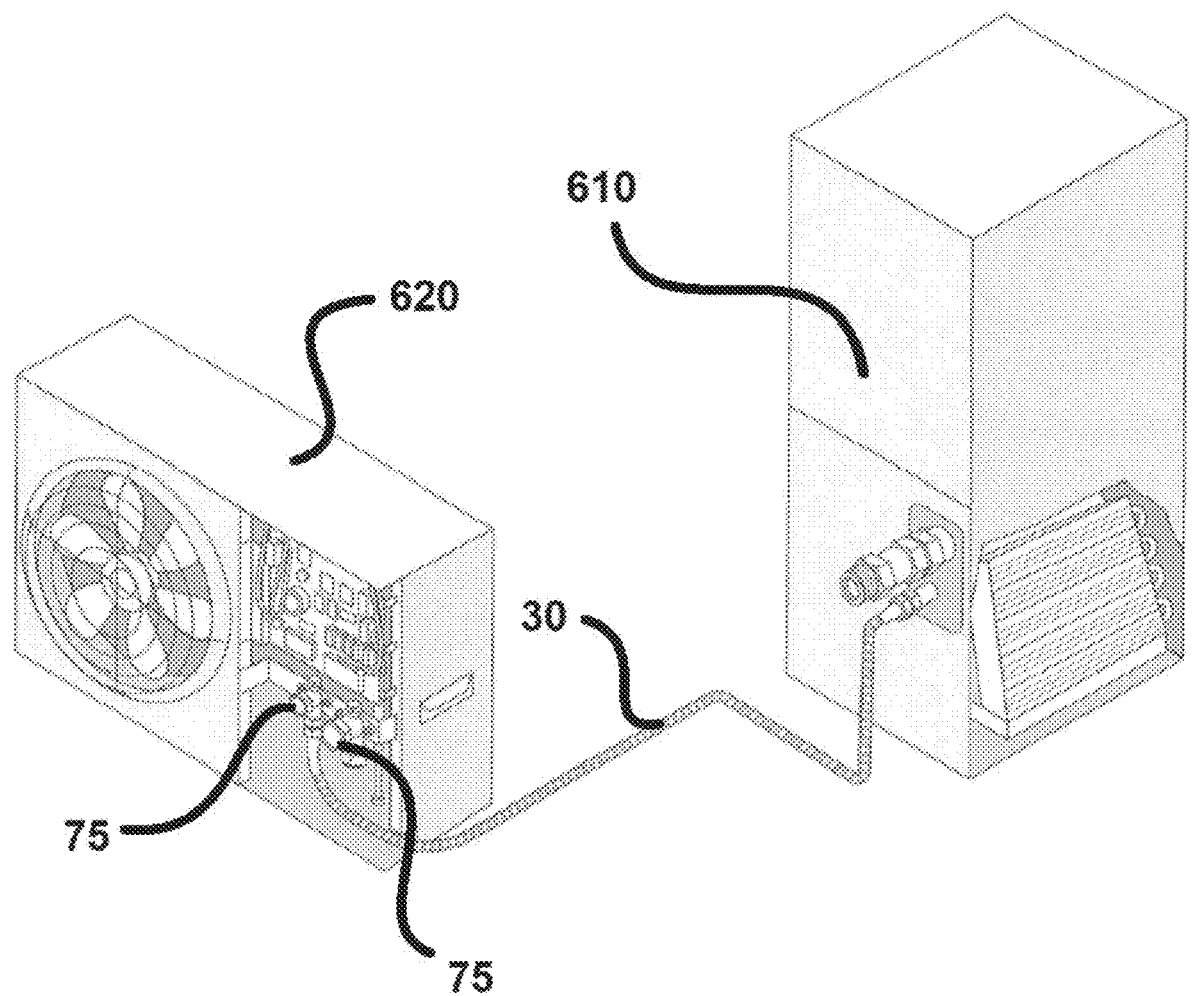
FIG. 18 shows the line-set of the present invention installed on a ducted HVAC system to depict a variant usage case of the quick-connect mechanisms of the present invention.

Alternate variations on the usage of the pre-charged line-set (30) including the male quick-connect connectors (140) and female quick-connect connectors (130) are envisioned for use in alternate embodiments of the present invention. These include, but are not limited to, the usage of the pre-charged line-set (30) of the present invention to facilitate the installation of conventional ducted HVAC systems. In such embodiments, the ducted HVAC air handler (610) is connected to the ducted HVAC condenser (620) via the pre-charged line-set (30) of the present invention via the quick-connector system by mating female quick-connect connectors (130) disposed on both ends of the pre-charged line-set (30) to male quick-connect connectors (140) disposed on the ducted HVAC air handler (610) and ducted HVAC condenser (620) as shown in FIG. 18.

Figure 19:
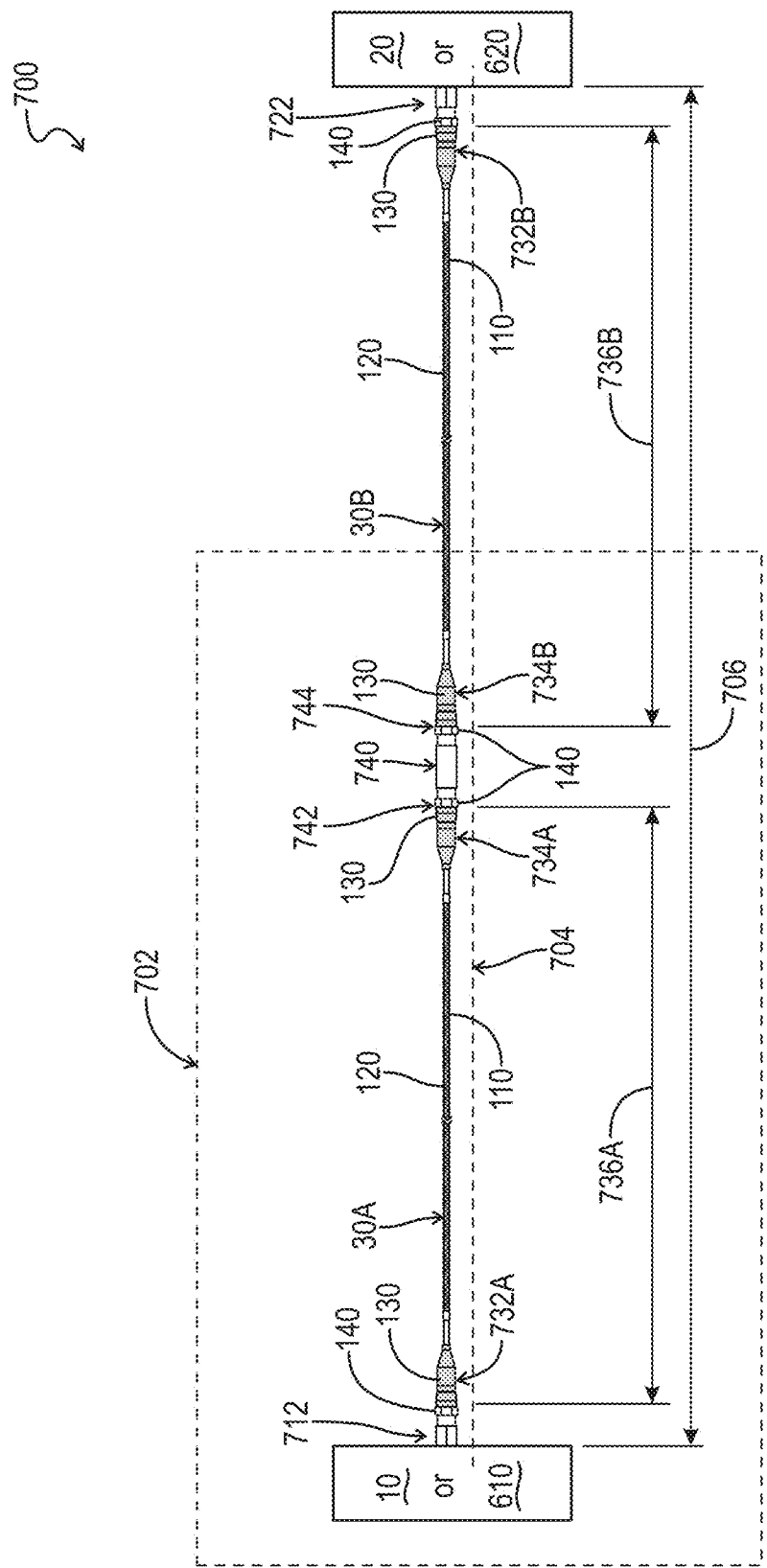
FIG. 19 illustrates a top plan view of an HVAC system in accordance with embodiments of the present invention.
Figure 20:
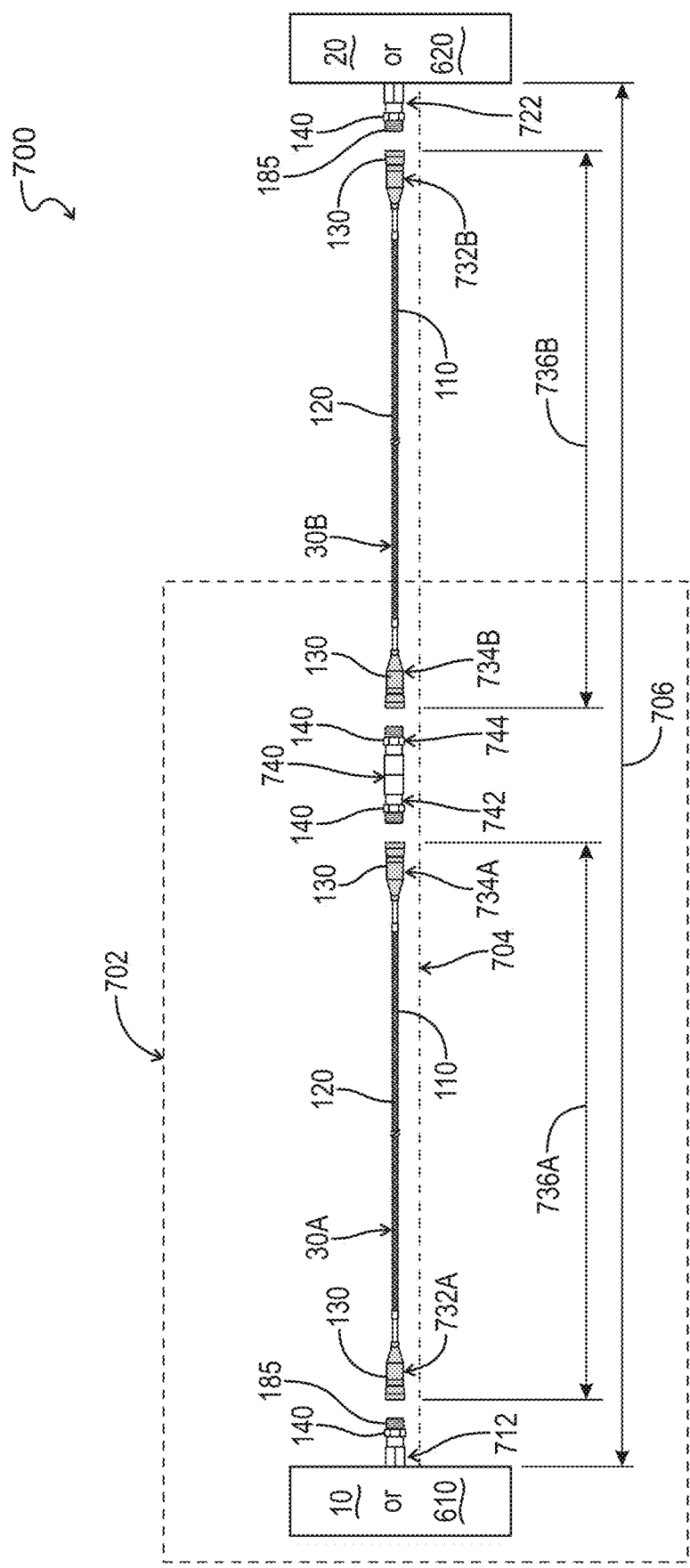
FIG. 20 illustrates an exploded illustrates a top plan view of the HVAC system of FIG. 19.

Referring to FIGS. 19-20, certain additional embodiments of an HVAC system (700) are shown. The HVAC system (700) shares many common elements with the ductless and ducted HVAC systems previously described. Accordingly, similar elements may be numbered similarly. One of skill in the art will understand that certain details from the previously described ductless and ducted HVAC systems and their methods of installation are applicable to the HVAC system (700), and likewise, certain details from the HVAC system (700) the previously described ductless and ducted HVAC systems and their methods of installation.

The HVAC system (700) includes an indoor unit (10), an outdoor unit (20), a first pre-charged line-set (30A), a second pre-charged line-set (30B), and a line-set coupler (740). The indoor unit (10) may be ductless or ducted and accordingly may also be referred to herein as a ducted HVAC air handler (610) or an air handler (10, 610). The outdoor unit (20) may likewise be ductless or ducted and accordingly may also be referred to herein as a ducted HVAC condenser (620) or a condenser (20, 620). The first pre-charged line-set (30A) may also be referred to herein as a first pre-pressurized refrigerant line-set (30A), a first pre-charged refrigerant piping (30A), or a first pre-charged refrigerant tubing (30A). The second pre-charged line-set (30B) may also be referred to herein as a second pre-pressurized refrigerant line-set (30B), a second pre-charged refrigerant piping (30B), or a second pre-charged refrigerant tubing (30B). The line-set coupler (740) may also be referred to herein as a pre-charged refrigerant line-set coupler (740) or a pre-pressurized refrigerant line-set coupler (740).

As can best be seen in FIGS. 19 and 20, the indoor unit (10) of the HVAC system (700) may be positioned inside a location of installation (702). The outdoor unit (20) of the HVAC system (700) may be positioned inside the location of installation (702). The indoor unit (10) includes at least one indoor unit refrigerant port (712). And the outdoor unit (20) includes at least one outdoor unit refrigerant port (722)

The first pre-charged line-set (30A) includes a first line-set proximal end (732A), a first line-set distal end (734A), and a first line-set length (736A) defined between the first line-set proximal end (732A) and the first line-set distal end (734A). The first line-set proximal end (732A) is couplable to the at least one indoor unit refrigerant port (712) of the indoor unit (10). The first line-set distal end (734A) is configured to extend along a run path (704) toward the outdoor unit (20). The run path (704) may include a run path length (706) defined between the indoor unit (10) and the outdoor unit (20). In certain optional embodiments, the run path (704) may not be straight and may include several bends, curves, turns, or the like. As illustrated, the first line-set length (736A) is less than the run path length (706). In other optional embodiments, the first line-set length (736A) may be great than or equal to the run path length (706).

The second pre-charged line-set (30B) includes a second line-set proximal end (732B), a second line-set distal end (734B), and a second line-set length (736B) defined between the second line-set proximal end (732B) and the second line-set distal end (734B). The second line-set proximal end is couplable to the at least one outdoor unit refrigerant port (722) of the outdoor unit (20). The second line-set distal end (734B) is configured to extend along the run path (704) toward the indoor unit (10). As illustrated, the second line-set length (736B) is less than the run path length. In other optional embodiments, the second line-set length (736B) may be great than or equal to the run path length (706). In some optional embodiments, the total of the first line-set length (736A) and the second line-set length (736B) may be greater than or equal to the run path length (706)

The line-set coupler (740) includes a first coupler end (742) and a second coupler end (744). The first coupler end (742) is couplable to the first line-set distal end (734A) of the first pre-charged line-set (30A). The second coupler end (744) is couplable to the second line-set distal end (734B) of the second pre-charged line-set (30B). As can be seen in FIGS. 25 and 26, the line-set coupler (740) includes a coupler length (746) and a coupler diameter (748). The coupler length (746) may be at least three times greater than the coupler diameter (748). In certain optional embodiments, the coupler length (746) may be not more than eight times greater than the coupler diameter (748).

In certain optional embodiments, each of the indoor unit (10), the outdoor unit (20), the first pre-charged line-set (30A), the second pre-charged line-set (30B), and the line-set coupler (740) contain a pre-pressurized refrigerant (750). The pre-pressurized refrigerant (750) may be exclusively contained within the given element prior to connecting two or more of the indoor unit (10), the outdoor unit (20), the first pre-charged line-set (30A), the second pre-charged line-set (30B), and the line-set coupler (740). In certain other optional embodiments, the line-set coupler (740) may come void of any refrigerant contained therein prior to being coupled with one of the first pre-charged line-set (30A) or the second pre-charged line-set (30B).

Each of the first line-set proximal end (732A), the first line-set distal end (734A), the second line-set proximal end (732B), and second line-set distal end (734B) may include an automatic valve of a first valve type. The automatic valve of the first valve type may be a female quick-connect connector (130), as described above. In other optional embodiments, the automatic valve of the first valve type may implement a different structure than the female quick-connect connector (130), however, with the same purpose as and requirements associated with the female quick-connect connector (130).

Each of the at least one indoor unit refrigerant port (712) of the indoor unit (10), the at least one outdoor unit refrigerant port (722) of the outdoor unit (20), the first coupler end (742), and the second coupler end (744) may include an automatic valve of a second valve type. The automatic valve of the second valve type may be a male quick-connect connector (140), as described above. In other optional embodiments, the automatic valve of the second valve type may implement a different structure than the male quick-connect connector (140), however, with the same purpose as and requirements associated with the male quick-connect connector (140).

Figure 21:
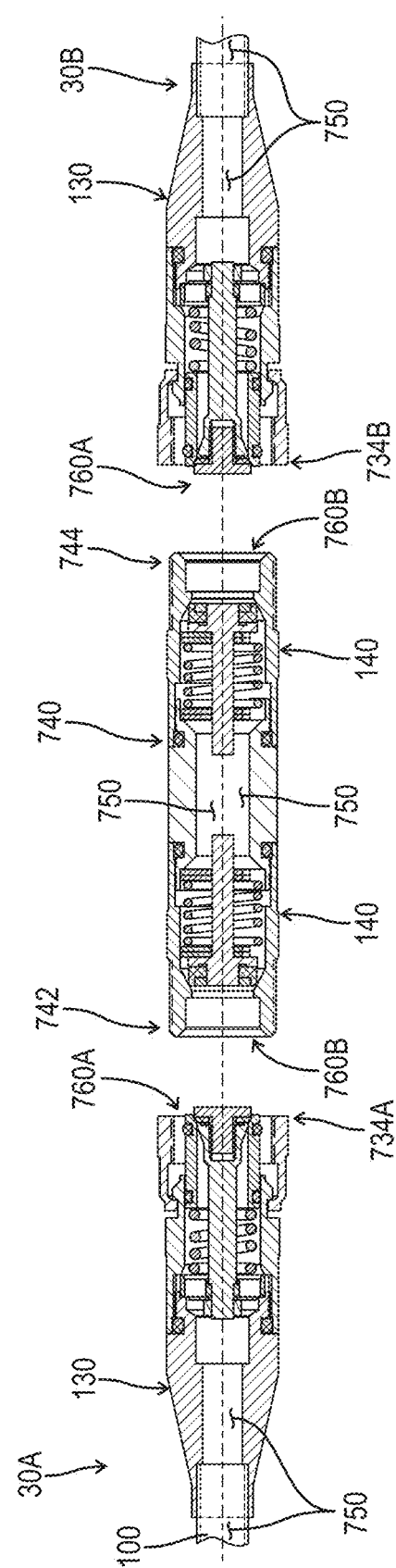
FIG. 21 illustrates an exploded cross-sectional front elevation view of the HVAC system of FIG. 19 taken of area 21-21 of FIG. 20.
Figure 22:
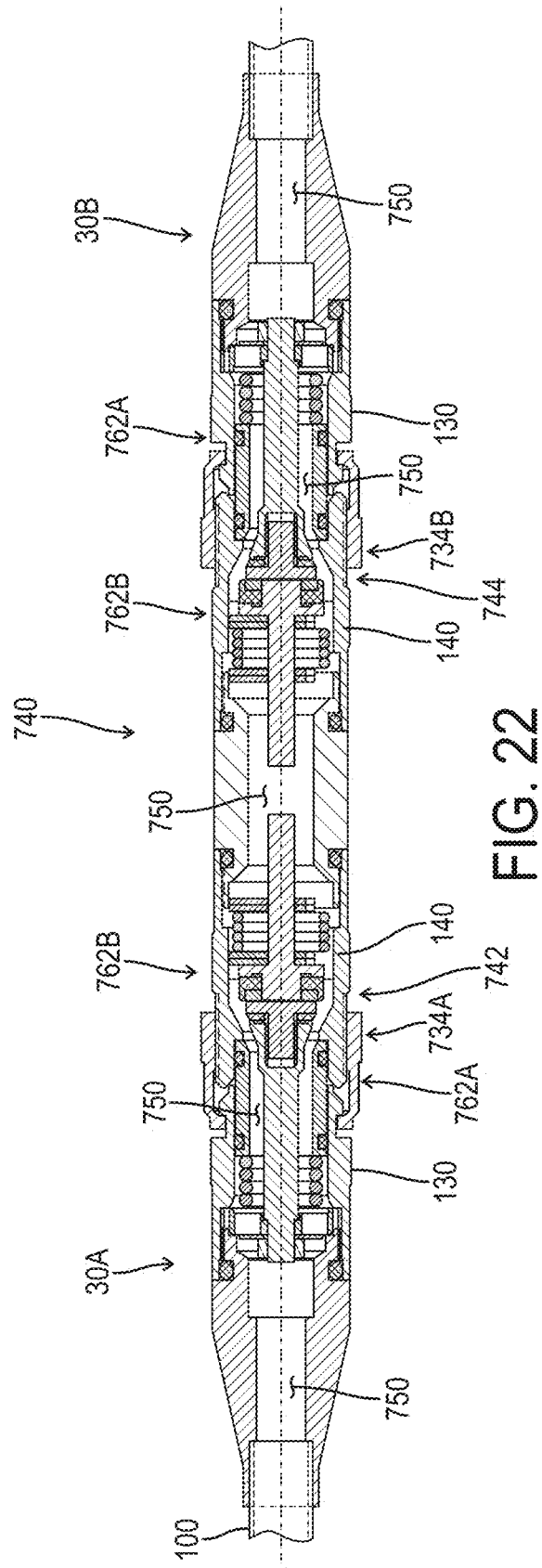
FIG. 22 illustrates a cross-sectional front elevation view of the HVAC system of FIG. 19 taken of area 22-22 of FIG. 19
Figure 23:
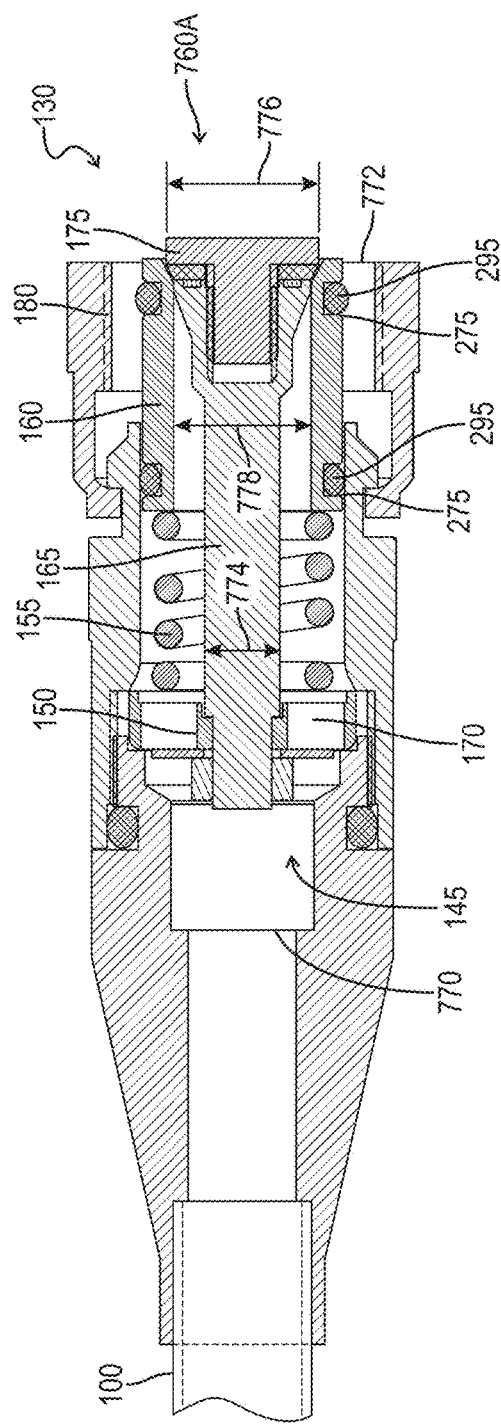
FIG. 23 illustrates an enlarged cross-sectional front elevation view a female quick-connect connector of the HVAC system of FIG. 19 in a closed configuration.
Figure 24:
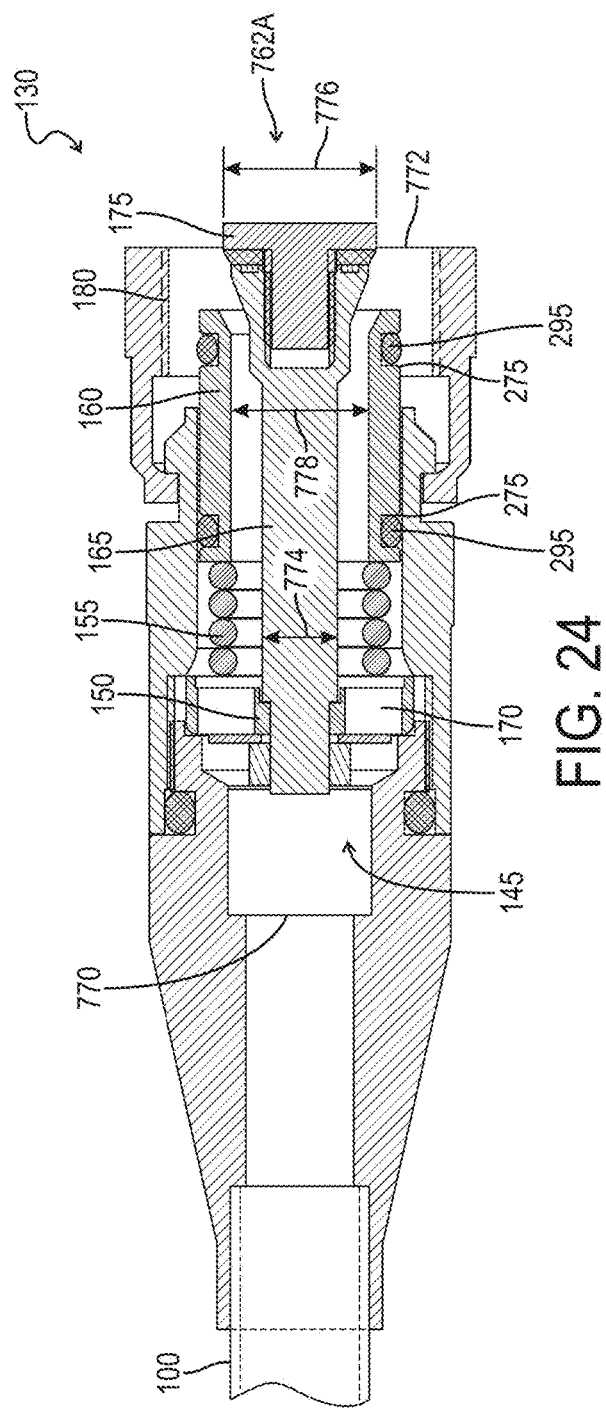
FIG. 24 illustrates an enlarged cross-sectional front elevation view the female quick-connect connector of FIG. 23 in an open configuration.

As can best be seen in FIGS. 21, 23, and 25, the female quick-connect connector (130) (i.e., the automatic valve of the first valve type) and male quick-connect connector (140) (i.e., the automatic valve of the second valve type) are biased toward respective closed configurations (760A, 760B). As can best be seen in FIGS. 22, 24, and 26, The female quick-connect connector (130) (i.e., the automatic valve of the first valve type) is configured to engage the male quick-connect connector (140) (i.e., the automatic valve of the second valve type) to position both the female quick-connect connector (130) and the male quick-connect connector (140) in respective open configurations (762A, 762B). The closed configurations (760A, 760B) may also be referred to as closed positions (760A, 760B). The open configurations (762A, 762B) may also be referred to as open positions (762A, 762B).

The female quick-connect connector (130) as described above is repeated here for clarity with regard to the HVAC system (700). As can best be seen in FIGS. 23 and 24, the female quick-connect connector (130) of the HVAC system (700) includes a through hole (145), a shaft seat (150), a rod (165), a rod head (175), a sleeve (160), at least one O-ring (295), and a first return spring (155). The through hole (145) may also be referred to herein as a first valve passageway (145). The through hole (145) may be communicatively linked between an inner first valve opening (770) and an outer first valve opening (772). The shaft seat (150) may be fixedly coupled within the through hole (145) nearer to the inner first valve opening (770) than to the outer first valve opening (772). The rod (165) may be fixedly coupled to the shaft seat (150) and may extend toward the outer first valve opening (772). The rod (165) may include a rod diameter (774). The rod head (175) may be disposed on the rod (165) distally to the shaft seat (150). The rod head (175) may include a rod head diameter (776) that is greater than the rod diameter (774). The sleeve (160) may be positioned within the through hole (145) between the shaft seat (150) and the rod head (175). The sleeve (160) includes an inner sleeve diameter (778) that is less than the rod head diameter (776). In certain optional embodiments, the rod head (175) and a portion of the sleeve (160) may be complimentarily shaped to fit together for forming a tight seal. The O-ring (295) is disposed in each of the one or more O-ring grooves (275) of the sleeve (160). At least one O-ring (295) is configured to maintain contact between the sleeve (160) and the through hole (145). The first return spring (155) may be disposed between the shaft seat (150) and the sleeve (160). The first return spring (155) may be configured to apply a force to the sleeve (160) such that the sleeve (160) is biased to contact the rod head (175) for closing the outer first valve opening (772) of the through hole (145).

Upon connection of the female quick-connect connector (130) (i.e., the automatic valve of the first valve type) with the male quick-connect connector (140) (i.e., the automatic valve of the second valve type), the sleeve (160) is moved toward the inner first valve opening (770) to thereby compress the first return spring (155) and to open the through hole (145) of the female quick-connect connector (130).

The male quick-connect connector (140) as described above is repeated here for clarity with regard to the HVAC system (700). As can best be seen in FIGS. 25 and 26, the male quick-connect connector (140) of the HVAC system (700) includes a second valve passageway (780), a rear support plate (245), a front support plate (225), valve stem (215), a valve head (205), and a second return spring (235). The second valve passageway (780) is communicatively linked between an inner second valve opening (782) and an outer second valve opening (784). The second valve passageway (780) may include a cavity portion (195) and a receptacle portion (788) separated by an intermediate second valve opening (786) having an intermediate second valve opening diameter (790) less than respective diameters of the cavity portion (195) and the receptacle portion (788). The cavity portion (195) may be positioned between the inner second valve opening (782) and the intermediate second valve opening (786). The receptacle portion (788) may be open to the outer second valve opening (784).

The rear support plate (245) may be fixedly coupled to the second valve passageway (780) closer to the inner second valve opening (782) than to the intermediate second valve opening (786). The front support plate (225) may be slidably received by the second valve passageway (780) closer to the intermediate second valve opening (786) than to the inner second valve opening (782). The valve stem (215) may be fixedly coupled to the front support plate (225) and slidably received through the rear support plate (245). The valve head (205) may be disposed on the valve stem (215) distally to the rear support plate (245). The valve head (205) may include a valve head diameter (792) that is greater than the intermediate second valve opening diameter (790).

The second return spring (235) may be disposed between the rear support plate (245) and the front support plate (225). The second return spring (235) may be configured to apply a force to the front support plate (225) such that the valve head (205) is biased to maintain contact with the intermediate second valve opening (786) to thereby close the intermediate second valve opening (786) of the second valve passageway (780).

Upon connection of the male quick-connect connector (140) (i.e., the automatic valve of the second valve type) with the female quick-connect connector (130) (i.e., the automatic valve of the first valve type), the valve head (205) is moved toward the inner second valve opening (782) to thereby compress the second return spring (235) and to open the intermediate second valve opening (786) of the second valve passageway (780).

In certain optional embodiments, the receptacle portion (788) of the second valve passageway (780) includes a 90-degree support rim (794) defined circumferentially about the intermediate second valve opening (786). In certain other optional embodiments, the 90-degree support rim (794) may be angled differentially. Upon connection of the female quick-connect connector (130) (i.e., the automatic valve of the first valve type) with the male quick-connect connector (140) (i.e., the automatic valve of the second valve type), the 90-degree support rim (794) of the male quick-connect connector (140) acts upon the sleeve (160) of the female quick-connect connector (100) to thereby open the female quick-connect connector (130). Likewise, the rod head (175) of the female quick-connect connector (130) acts upon the valve head (205) of male quick-connect connector (140) to thereby open the male quick-connect connector (140). These actions may occur simultaneously upon engagement of the female quick-connect connector (130) with the male quick-connect connector (140). Accordingly, the sleeve (160) is configured to selectively abut the rod head (175) for opening and closing the female quick-connect connector (130). Likewise, the valve stem (215) including the valve head (205) is configured to selectively abut the intermediate second valve opening (786) for opening and closing the male quick-connect connector (140).

In certain optional embodiments, each of the first line-set proximal end (732A), the first line-set distal end (734A), the second line-set proximal end (732B), and second line-set distal end (734B) include a respective interiorly threaded portion (180). Each of the at least one indoor unit refrigerant port (712) of the indoor unit (10), the at least one outdoor unit refrigerant port (722) of the outdoor unit (20), the first coupler end (742), and the second coupler end (744) include an exteriorly threaded portion (185) configured to engage the interiorly threaded portion (180) of one of the first line-set proximal end (732A), the first line-set distal end (734A), the second line-set proximal end (732B), and second line-set distal end (734B).

Further disclosed herein is a method of installing the HVAC system (700). The method includes step (a) threadedly engaging the first line-set proximal end (732A) of the first pre-charged line-set (30A) with the indoor unit refrigerant port (712) of the indoor unit (10) to open respective automatic valves (e.g., the female quick-connect connector (130) and the male quick-connect connector (140)) of the first line-set proximal end (732A) of the first pre-charged line-set (30A) and the indoor unit refrigerant port (712) to enable fluid communication between the first line-set proximal end (732A) of the first pre-charged line-set (30A) and the indoor unit (10).

The method further includes step (b) threadedly engaging the first line-set distal end (734A) of the first pre-charged line-set (30A) with the first coupler end (742) of the line-set coupler (740) to open respective automatic valves (e.g., the female quick-connect connector (130) and the male quick-connect connector (140)) of the first line-set distal end (734A) of the first pre-charged line-set (30A) and the first coupler end (742) of the line-set coupler (740) to enable fluid communication between the first pre-charged line-set (30A) and the pre-charged coupler (740).

The method further includes step (c) threadedly engaging the second line-set proximal end (732B) of a second pre-charged line-set (30B) with the indoor unit refrigerant port (712) of the indoor unit (10) to open respective automatic valves (e.g., the female quick-connect connector (130) and the male quick-connect connector (140)) of the second line-set proximal end (732B) of a second pre-charged line-set (30B) and the indoor unit refrigerant port (712) of the indoor unit (10) to enable fluid communication between the second pre-charged line-set (30B) and the indoor unit (10).

The method further includes step (d) threadedly engaging the line-set distal end (734B) of the second pre-charged line-set (30B) with the second coupler end (744) of the line-set coupler (740) to open respective automatic valves (e.g., the female quick-connect connector (130) and the male quick-connect connector (140)) of the line-set distal end (734B) of the second pre-charged line-set (30B) and the second coupler end (744) of the line-set coupler (740) to enable fluid communication between the second pre-charged line-set (30B) and the line-set coupler (740).

In certain optional embodiments, step (a) of the method may further include maintaining the automatic valve (e.g., the female quick-connect connector (130)) of the first line-set distal end (734A) of the first pre-charged line-set (30A) in a closed position, shown in FIG. 21, when step (a) is performed prior to step (b).

In certain optional embodiments, step (b) of the method may further include maintaining the automatic valve (e.g., the male quick-connect connector (140)) of the second coupler end (744) of the line-set coupler (740) in a closed position, shown in FIG. 21, when step (b) is performed prior to step (d).

In certain optional embodiments, step (b) of the method may further include maintaining the automatic valve (e.g., the female quick-connect connector (130)) of the second line-set distal end (734B) of the second pre-charged line-set (30B) in a closed position, shown in FIG. 21, when step (c) is performed prior to step (d).

In certain optional embodiments, step (b) of the method may further include maintaining the automatic valve (e.g., the male quick-connect connector (140)) of the first coupler end (742) of the line-set coupler (740) in a closed position, shown in FIG. 21, when step (d) is performed prior to step (b).

In certain optional embodiments, the method may further include maintaining the automatic valves (e.g., the female quick-connect connectors (130) and the male quick-connect connectors (140)) of each of the indoor unit (10), the outdoor unit (20), the line-set coupler (740), and the first and second pre-charged line-sets (30A, 30B) in respective closed positions prior to engagement thereof. Additionally, the method may further include returning the automatic valves to the respective closed positions, shown in FIG. 21, from respective open positions, shown in FIG. 22, upon disengagement.

In certain optional embodiments, during steps (a-d) the method may further include maintaining a common fluid pressure for refrigerant (750) contained within each of the indoor unit (10), the outdoor unit (20), the line-set coupler (740), and the first and second pre-charged line-sets (30A, 30B).

In certain optional embodiments, the method may further include moving the sleeve (160) of one of the respective automatic valves (e.g., the female quick-connect connectors (130)) to an open position, shown in FIG. 22, during at least one of steps (a-d).

In certain optional embodiments, the method may further include moving a valve stem (215) and valve head (205) of a different one of the respective automatic valves (e.g., the male quick-connect connectors (140)) to an open position, shown in FIG. 22, during at least one of steps (a-d).

One of skill in the art with appreciate that the method may include various additional method steps that are not herein disclosed.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

Thus, although there have been described particular embodiments of the present invention of a new and useful apparatus and process for amateur HVAC installation it is not intended that such references be construed as limitations upon the scope of this invention except as set forth in the following claims

What is claimed is:

1. A method of installing an HVAC system, the method comprising:
    (a) threadedly engaging a first end of a first pre-pressurized line-set with a condenser coolant port of a condenser unit to open respective automatic valves of the first end of the first pre-pressurized line-set and the condenser coolant port to enable fluid communication between the first pre-pressurized line-set and the condenser unit, wherein a first line-set is pressurized prior to being threadedly engaged to provide the first pre-pressurized line-set;
    (b) threadedly engaging a second end of the first pre-pressurized line-set with a first end of a pre-pressurized coupler to open respective automatic valves of the second end of the first pre-pressurized line-set and the first end of the pre-pressurized coupler to enable fluid communication between the first pre-pressurized line-set and the pre-pressurized coupler, wherein a coupler is pressurized prior to being threadedly engaged to provide the pre-pressurized coupler;
    (c) threadedly engaging a first end of a second pre-pressurized line-set with an air handler coolant port of an air handler unit to open respective automatic valves of the first end of the second pre-pressurized line-set and the air handler coolant port to enable fluid communication between the second pre-pressurized line-set and the air handler unit, wherein a second line-set is pressurized prior to being threadedly engaged to provide the second pre-pressurized line-set; and
    (d) threadedly engaging a second end of the second pre-pressurized line-set with a second end of the pre-pressurized coupler to open respective automatic valves of the second end of the second pre-pressurized line-set and the second end of the pre-pressurized coupler to enable fluid communication between the second pre-pressurized line-set and the pre-pressurized coupler.

2. The method of claim 1, wherein step (a) further comprises:
    maintaining the automatic valve of the second end of the first pre-pressurized line-set in a closed position when step (a) is performed prior to step (b).

3. The method of claim 1, wherein step (b) further comprises:
    maintaining the automatic valve of the second end of the pre-pressurized coupler in a closed position when step (b) is performed prior to step (d).

4. The method of claim 1, wherein step (c) further comprises:
    maintaining the automatic valve of the second end of the second pre-pressurized line-set in a closed position when step (c) is performed prior to step (d).

5. The method of claim 1, wherein step (d) further comprises:
    maintaining the automatic valve of the first end of the pre-pressurized coupler in a closed position when step (d) is performed prior to step (b).

6. The method of claim 1, further comprising:
    maintaining the automatic valves of each of the condenser unit, the air handler unit, the pre-pressurized coupler, and the first and second pre-pressurized line-sets in respective closed positions prior to engagement; and
    returning the automatic valves to the respective closed positions from respective open positions upon disengagement.

7. The method of claim 1, wherein during steps (a-d) the method further comprises:
    maintaining a common fluid pressure for coolant fluid contained within each of the condenser unit, the air handler unit, the pre-pressurized coupler, and the first and second pre-pressurized line-sets.

8. The method of claim 1, further comprising:
    moving a sleeve of one of the respective automatic valves to an open position during at least one of steps (a-d).

9. The method of claim 8, further comprising:
    moving a valve stem and valve head of a different one of the respective automatic valves to an open position during at least one of steps (a-d).

* * * * *